(12) United States Patent
Imai

(10) Patent No.: US 7,755,822 B2
(45) Date of Patent: Jul. 13, 2010

(54) MULTIBEAM OPTICAL SCANNING DEVICE AND IMAGE FORMING APPARATUS

(75) Inventor: Shigeaki Imai, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 119 days.

(21) Appl. No.: 12/208,479

(22) Filed: Sep. 11, 2008

(65) Prior Publication Data

US 2009/0073529 A1    Mar. 19, 2009

(30) Foreign Application Priority Data

Sep. 14, 2007    (JP)    ............... 2007-240239

(51) Int. Cl.
*G02B 26/08* (2006.01)
(52) U.S. Cl. .................. 359/204.1; 359/205.1
(58) Field of Classification Search ............. 359/196.1, 359/204.1, 205.1, 206.1, 207.1, 212.1, 216.1
See application file for complete search history.

(56) References Cited

U.S. PATENT DOCUMENTS

| | | | |
|---|---|---|---|
| 6,813,051 B2 | 11/2004 | Suzuki et al. | |
| 7,085,031 B2 * | 8/2006 | Tomioka | 359/205.1 |
| 7,277,212 B2 | 10/2007 | Miyatake et al. | |
| 2004/0240000 A1 | 12/2004 | Miyatake et al. | |
| 2005/0190420 A1 | 9/2005 | Imai et al. | |
| 2006/0158711 A1 | 7/2006 | Imai et al. | |
| 2007/0058255 A1 | 3/2007 | Imai et al. | |
| 2007/0236557 A1 | 10/2007 | Imai et al. | |
| 2008/0019255 A1 | 1/2008 | Imai et al. | |
| 2008/0068678 A1 | 3/2008 | Suzuki et al. | |
| 2008/0170283 A1 | 7/2008 | Imai | |
| 2008/0192323 A1 | 8/2008 | Nakamura et al. | |

FOREIGN PATENT DOCUMENTS

| | | |
|---|---|---|
| JP | 4-171415 | 6/1992 |
| JP | 9-64444 | 3/1997 |
| JP | 10-227992 | 8/1998 |
| JP | 3507244 | 12/2003 |
| JP | 3920487 | 2/2007 |

* cited by examiner

*Primary Examiner*—Euncha P Cherry
(74) *Attorney, Agent, or Firm*—Oblon, Spivak, McClelland, Maier & Neustadt, L.L.P.

(57) ABSTRACT

A multibeam optical scanning device includes a plurality of light sources; a collimating lens; an aperture; a cylinder lens; a light deflecting unit; a scanning optical system; and a phase adjusting element. The phase adjusting element performs phase adjustments of wavefronts of the light beams to expand a depth allowance without substantially increasing a beam spot size of each of the beam spots on the scanning surface.

13 Claims, 18 Drawing Sheets

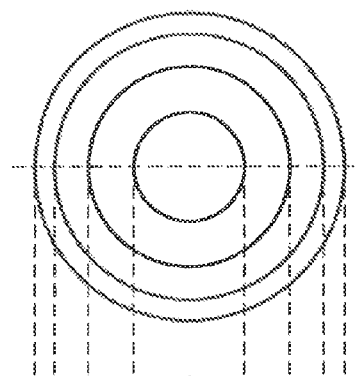
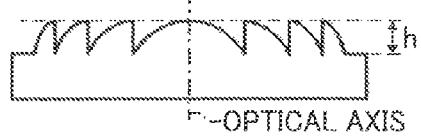
FIG. 10A
FIG. 10B
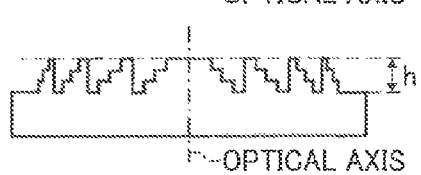
FIG. 10C
FIG. 11
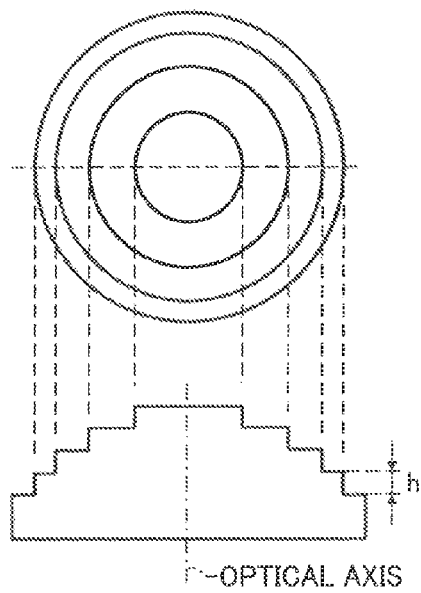

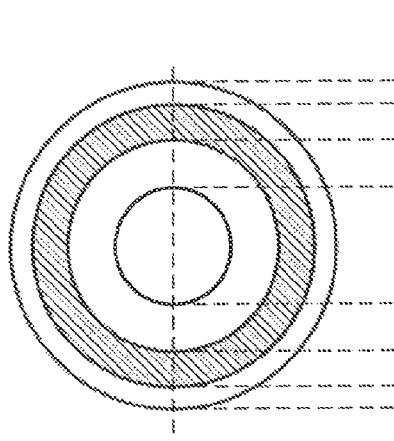
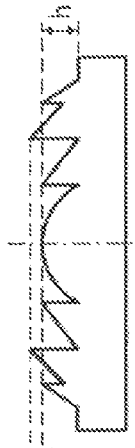
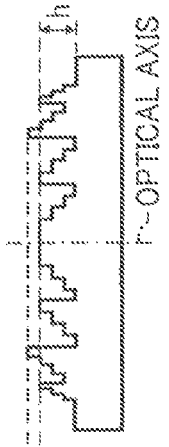
FIG. 12A
FIG. 12B
FIG. 12C
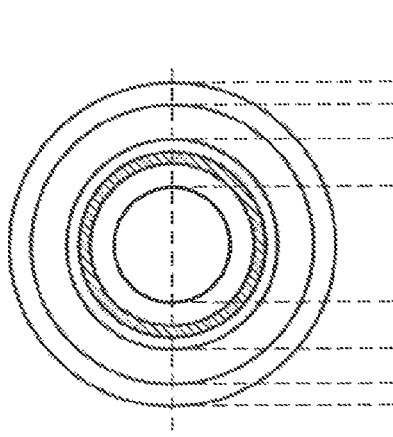
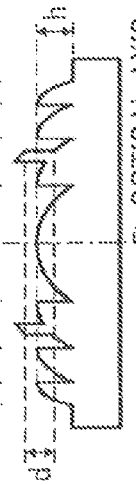
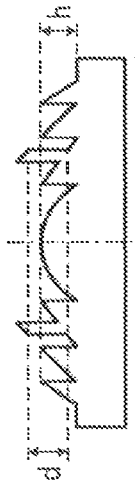
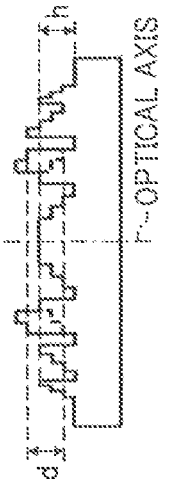
FIG. 13A
FIG. 13B
FIG. 13C

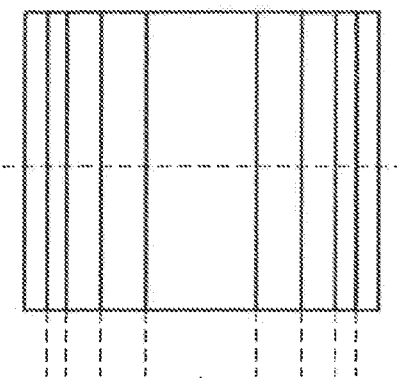
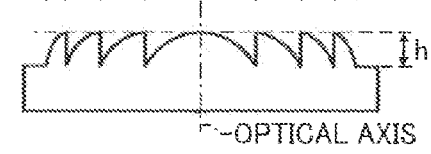
FIG. 16A
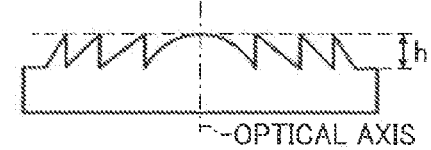
FIG. 16B
FIG. 16C
FIG. 17
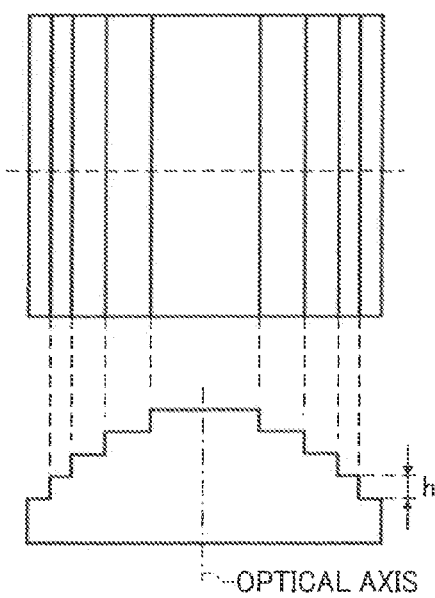

390 μm    210 μm 210, 390, 690, 750, AND 930 μm FROM
SMALLEST TO LARGEST DIAMETERS

MULTIBEAM OPTICAL SCANNING DEVICE AND IMAGE FORMING APPARATUS

CROSS-REFERENCE TO RELATED APPLICATIONS

The present application claims priority to and incorporates by reference the entire contents of Japanese priority document 2007-240239 filed in Japan on Sep. 14, 2007.

BACKGROUND OF THE INVENTION

1. Field of the Invention

The present invention relates to a multibeam optical scanning device and an image forming apparatus.

2. Description of the Related Art

"An optical scanning device causing a deflecting unit to deflect a light beam from a laser light source and causing a focusing optical system to focus the light beam into a beam spot on a scanning surface to optically scan the scanning surface" is widely known as a device related to such an image forming apparatus as a digital copier, a laser printer, a laser facsimile, and a laser plotter. The optical scanning device offers a variety of variants in its specific applications.

In techniques related to optical scanning, "faster optical scanning" is one of problems to which solutions have been sought. One method for faster image formation by optical scanning is "multibeam optical scanning", which enables optical writing along a plurality of scanning lines by one stroke of optical scanning, thus significantly improves image formation speed.

Recently, a vertical-cavity surface-emitting semiconductor laser (VCSEL) is put in practical use. In the VCSEL, a plurality of light-emitting sources is arranged easily on the same plane. This makes the VCSEL a preferable light source for the above multibeam optical scanning.

Another problem to be solved with regard to an optical scanning device is that a higher pixel density in optical writing has been in demand to enable highly definite image formation. To form a highly definite image by optical writing, "reducing and stabilizing a beam spot size" is essential.

Stabilizing a beam spot size requires "enlarging the depth allowance of the beam spot".

The optical scanning device is designed so that the beam waist position of a light beam matches a scanning surface. For this reason, in terms of design, a "beam spot size" is equivalent to a "beam waist diameter" formed on an optical beam focusing unit. To reduce the beam spot size, therefore, the beam waist diameter must be reduced. Meanwhile, the beam diameter of a light beam increases as the light beam goes away from the beam waist position from the "boundary of the beam waist position".

In actual manufacturing of the optical scanning device, a manufacturing error or assembly error in manufacturing and assembling a component or optical element is inevitably involved in the optical scanning device. In general, therefore, a "gap" due to such an error results between the beam waist position and the "surface of a photosensitive image carrier that is actually the scanning surface". When the scanning surface position separates from the beam waist position because of this "gap", the beam spot size on the scanning surface increases regardless of whether the "gap" results at the backward side or forward side in the direction of advance of the light beam. Such an "increase in a beam spot size due to a gap" is called "spot size dilution", and the above "gap" is called "defocusing".

A "depth allowance" means an "allowable range of beam spot size dilution" against a design-based beam spot size, that is, a range of defocusing in the optical axis direction in which a "change in a beam spot size is allowable (e.g., 10% or less of a beam waist diameter). If defocusing of a light beam relative to a scanning surface is within the depth allowance, an actual beam spot size on the scanning surface is within the allowable range of spot size dilution, which enables proper optical scanning.

Reducing an error in the manufactured optical scanning device has a limitation, so that the dept allowance should preferably be large as much as possible.

The relational equation $d \propto w^2/\lambda$ is satisfied, where "d" is depth allowance, "w" is beam spot size, and "$\lambda$" is wavelength. This relational equation means that a "large depth allowance" requires a "large beam spot size". In other words, a reduction in the beam spot size w and an increase in the depth allowance d run counter to each other. Usually, therefore, reducing the beam spot size w results in the smaller depth allowance d, which degrades the stability of the beam spot size.

For "a reduction in a beam spot size" without the shrinkage of a depth allowance, directly expanding the depth allowance of the beam spot is necessary. A "pseudo-Bessel beam" is known as a "form of light beam" that realizes the expansion of the depth allowance of the beam spot. The pseudo-Bessel beam is generated using an annular thin slit, an axicon prism, or a binary optical element equivalent to the axicon prism (Japanese Patent No. 3507244, Japanese Patent Application Laid-open No. H09-64444, Japanese Patent Application Laid-open No. H04-171415, and Japanese Patent Application Laid-open No. H10-227992).

Another known depth allowance expanding method is a "method of using an optical element that brings light intensity at four corners of an exit pupil higher than light intensity at the center of the pupil" (Japanese Patent Application Laid-open No. 2000-249950).

The Bessel beam or a beam similar to it can be generated by shielding the central part of the beam, but shielding the central part of such a beam having greater intensity results in an extremely large light quantity loss. A method using an axicon prism (or a binary optical element equivalent to the axicon prism) is known as another Bessel beam generating method that avoids light quantity loss.

This method alleviates the above problem of light quantity loss by shielding. According to this method, however, the Bessel beam is generated near the axicon prism, which may pose a limitation in layout work. For example, when the method is applied to the optical scanning device incorporated in the image forming apparatus, a Bessel region and a scanning surface must be in a conjugated arrangement, which requires an additional relay optical system, etc. This may lead to an increase in the number of lenses, a size increase in the optical system, and a cost increase.

At "a beam spot formed by the Bessel beam", "the light intensity of a side lobe" in a beam profile is extremely high, and the light intensity of high-order side lobe light is also high. For example, when "an ideal (first type in zero order) amplitude distribution following the Bessel function" is obtained as the amplitude distribution of a light beam, the light intensity of first and second lobes is high relative to the light intensity of the main lobe, standing at 16% and 9% of the light intensity of the main lobe, respectively. Because high-order side lobe light occupies a broader area than low-order side lobe light, the light intensity of the main lobe drops widely as the light intensity of high-order side lobe light rises.

As a result, since main lobe light is used as signal light, light use efficiency drops substantially.

In optical scanning, too great side lobe light intensity is not preferable because "side lobe light constitutes noise light". Because high-order side lobe light arises at a location distant from the optical axis, high-order side lobe light is spatially separated from main lobe light having the largest light intensity peak, and tends to act as a noise. In the optical scanning device of the image forming apparatus, when the peak of side lobe light is distant from the peak of the main lobe light, "a thin line of fringe is formed around a dot formed by main lobe light", which may degrade image quality.

According to the method of Japanese Patent Application Laid-open No. 2000-249950, a beam from a semiconductor laser is "a Gaussian beam having light intensity of the Gaussian distribution". When this Gaussian beam passes the opening of an aperture, light intensity at "four corners of the opening" on the aperture is lower than light intensity at the center of the opening. To "bring light intensity at four corners of the exit pupil higher than light intensity at the center of the pupil" by converting phase distribution, light at the center have to be shifted to the periphery of the pupil. This encourages the generation of high-order light, and carrying out optical scanning with such a beam spot accompanying high-order light may cause scumming. In avoiding such a trouble, using only the light near the center of the Gaussian beam is effective in suppressing the generation of high-order light. This approach, however, increases an amount of light cut off by shielding to lower light use efficiency.

SUMMARY OF THE INVENTION

It is an object of the present invention to at least partially solve the problems in the conventional technology.

According to an aspect of the present invention, there is provided a multibeam optical scanning device that includes a plurality of light sources that respectively emit a plurality of light beams; a collimating lens that collimates the light beams; an aperture that shapes the light beams output from the collimating lens; a cylinder lens that focuses the light beams to form a plurality of line images each elongated in a main scanning direction and separated in a sub scanning direction near a deflecting reflection surface of a light deflecting unit that deflects the light beams focused by the cylinder lens; a scanning optical system that focuses the light beams deflected by the light deflecting unit into a plurality of beam spots separated in the sub scanning direction on a scanning surface to scan the scanning surface simultaneously with the beam spots; and a phase adjusting element that performs phase adjustments of wavefronts of the light beams to expand a depth allowance without substantially increasing a beam spot size of each of the beam spots on the scanning surface.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIGS. 10A to 10C are schematic diagrams of the structure of a conventional known diffraction lens;

FIG. 11 is a schematic diagram of the structure of a conventional known diffraction lens;

FIGS. 12A to 12C are schematic diagrams of a diffraction lens in which a phase corresponding to a height d is added to a diffraction lens surface of the diffraction lens of FIGS. 10A to 10C;

FIGS. 13A to 13C are schematic diagrams of a diffraction lens in which a phase corresponding to the height d is added to the diffraction lens surface of the diffraction lens of FIGS. 10A to 10C;

FIGS. 16A to 16C are schematic diagrams of a diffraction lens with a diffraction lens surface having a diffraction structure having power only in one direction;

FIG. 17 is a schematic diagram a diffraction lens with a diffraction lens surface having a diffraction structure not having power only in one direction;

DETAILED DESCRIPTION OF THE PREFERRED EMBODIMENTS

Exemplary embodiments of the present invention are explained in detail below with reference to the accompanying drawings.

Figure 1:
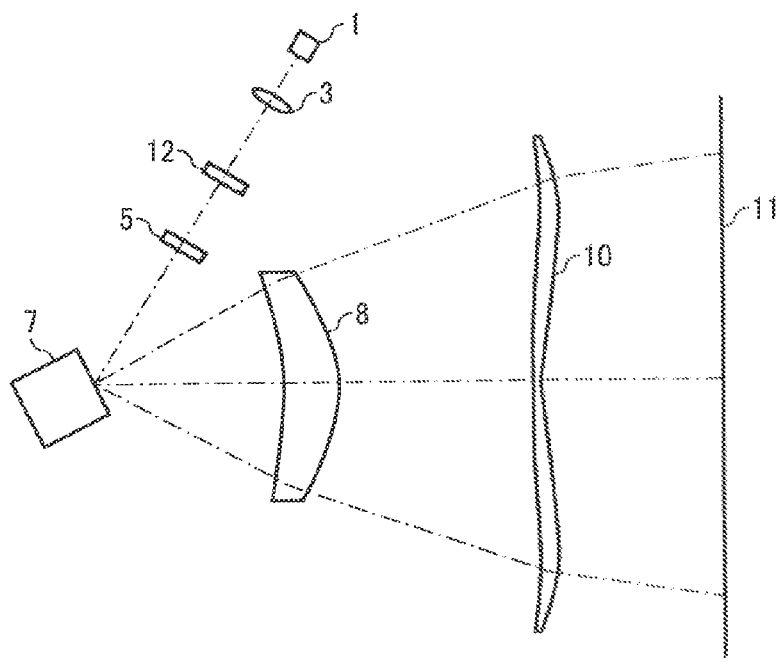
FIG. 1 is a schematic diagram of an optical scanning device according to an embodiment of the present invention.

FIG. 1 is a schematic diagram of an example of optical arrangement of a multibeam optical scanning device.

In FIG. 1, an optical system making up a light path leading from a multibeam light source 1 to a scanning surface 11 is developed imaginarily in a single plane.

The multibeam light source 1 is "a laser light source having a plurality of light-emitting sources" for multibeam optical scanning. In the present embodiment, the multibeam light source 1 is provided as a VCSEL having an array of light-emitting sources.

As shown in FIG. 1, each of a plurality of light beams emitted from the multibeam light source 1 (only the light path for a single light beam is shown in FIG. 1) is turned to a parallel light beam through a collimating lens 3, and passes through an optical member 12 to fall on a cylinder lens 5, which gives the light beams a tendency of convergence in a sub scanning direction (direction perpendicular to the plane of FIG. 1), and then are focused into "line images separated in the sub scanning direction and elongated in a main scanning direction" near a deflecting reflection surface of a polygon mirror 7, which serves as a deflecting unit. The polygon mirror 7 has four deflecting reflection surfaces in the present embodiment.

The light beams reflected by the deflecting reflection surfaces of the polygon mirror 7 travel through scanning lenses 8 and 10, which act on the beams to focus them into "beam spots separated in the sub scanning direction" on the scanning surface 11. The scanning lenses 8 and 10 make up "a scanning optical system", and are made of glass or resin.

When the polygon mirror 7 rotates at constant velocity, the light beams reflected by the deflecting reflection surfaces deflect at constant angular velocity. As a result, the beam spots scan the scanning surface 11 to carry out multibeam optical scanning.

The optical member 12 is constructed by integrating together an aperture and a phase adjusting element, which will be described later. The aperture shields a peripheral light beam region of each of the light beams to shape the beam, and the phase adjusting element performs phase adjustments of the wavefronts of the light beams.

The optical scanning lenses 8 and 10 making up the scanning optical system function as so-called "fθ lens", having a function of adjusting the displacement of beam spots of light beams deflecting at constant angular velocity on the scanning surface 11 to the displacement at constant speed.

With regard to the optical scanning lenses 8 and 10, the position of the deflecting reflection surface of the polygon mirror 7 and the position of the scanning surface 11 are in "a conjugate relation with regard to the sub scanning direction". In the sub scanning direction, "the line images elongated in the main scanning direction" are object points of the fθ lens composed of the scanning lenses 8 and 10, so that "surface-tilting" of the polygon mirror 7 is corrected. In this example, two scanning lenses 8 and 10 making up the fθ lens are both made of resin. A diffraction lattice can be formed on one or more lens surfaces, where the diffraction lattice corrects a change in a focusing function of the resin-made scanning lens due to an environmental change.

The scanning surface 11 in FIG. 1 is actually "the photosensitive surface of an image carrier".

The multibeam optical scanning device having the optical arrangement shown in FIG. 1 is the optical scanning device having a widely known conventional configuration except the phase adjusting element on the optical member 12. Combining the optical scanning devices having the configuration of FIG. 1 in an arrangement shown in FIG. 2 makes up a tandem optical scanning device.

Figure 2:
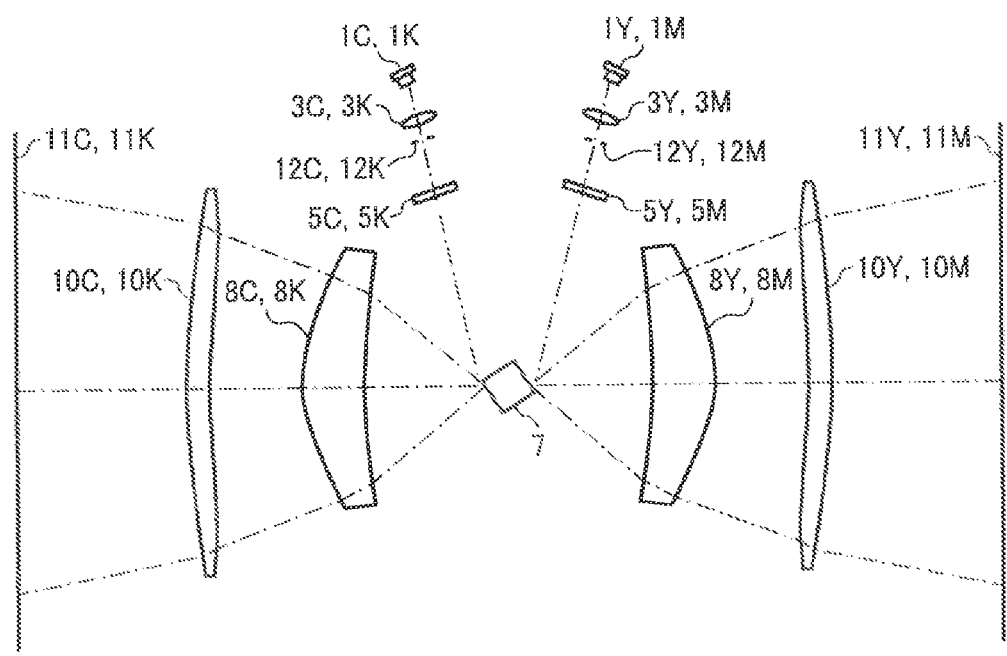
FIG. 2 is a schematic diagram of a tandem optical scanning device.

FIG. 2 depicts an optical system portion of the tandem optical scanning device as seen in the sub scanning direction, i.e., the direction in which the rotating shaft of the polygon mirror 7 serving as the deflecting unit extends. For simplifying the figure, light path bending mirrors on light paths leading from the polygon mirror 7 to scanning surfaces, which are optical scanning positions, are omitted to depict the light paths as if they were on a plane.

This multibeam optical scanning device scans each of four scanning surfaces 11Y, 11M, 11C, and 11K with a plurality of light beams in carrying out multibeam optical scanning. Image carriers are the substances of the four scanning surfaces 11Y, 11M, 11C, and 11K, and are "photoconductive photosensitive drums". Electrostatic latent images formed on these four photosensitive drums are developed separately with magenta toner, yellow toner, cyan toner, and black toner, and resulting toner images of four colors are superimposed together to form a color image. In the following description, the scanning surfaces and the photosensitive drums that are the substances of the scanning surfaces will be denoted by the same reference numerals.

In FIG. 2, reference numerals 1Y, 1M, 1C, and 1K denote "multibeam light sources". The multibeam light sources 1Y and 1M are arranged to overlap each other in the sub scanning direction perpendicular to the plane of FIG. 2. Each light-emitting source of the multibeam light source 1M is modulated in light intensity by "an image signal corresponding to a magenta image", and each light-emitting source of the multibeam light source 1Y is modulated in light intensity by "an image signal corresponding to a yellow image".

Likewise, the multibeam light sources 1C and 1K are arranged to overlap each other in the sub scanning direction. Each light-emitting source of the multibeam light source 1C is modulated in light intensity by "an image signal corresponding to a cyan image", and each light-emitting source of the multibeam light source 1K is modulated in light intensity by "an image signal corresponding to a black image".

Light beams emitted separately from the multibeam light sources 1Y and 1M are turned to parallel beams through collimating lenses 3Y and 3M (which are arranged to overlap each other in the sub scanning direction and receive incident beams from the laser light sources), passes through optical members 12Y and 12M (which are arranged to overlap each other in the sub scanning direction and carry out shielding of the peripheral beam region of each light beam (beam shaping) and phase adjustments), and then fall on cylinder lenses 5Y and 5M lined up in the sub scanning direction (to overlap each other in the sub scanning direction), where the light beams are focused in the sub scanning direction to be incident on the polygon mirror 7.

The cylinder lenses 5Y and 5M focus the light beams into a plurality of "line images elongated in the main scanning direction" near deflecting reflection surfaces of the polygon mirror 7, from which the plurality of deflected light beams travel to pass scanning lenses 8Y, 8M, 10Y, and 10M, which act on the light beams to form a plurality of beam spots on the scanning surfaces 11Y and 11M. Hence the scanning surfaces 11Y and 11M are scanned by the beam spots in multibeam optical scanning.

Likewise, light beams emitted separately from the multibeam light sources 1C and 1K are turned to parallel beams through collimating lenses 3C and 3K, passes through optical members 12C and 12K, and then fall on cylinder lenses 5C and 5K lined up in the sub scanning direction, where the light beams are focused in the sub scanning direction to be incident on the polygon mirror 7. Having been deflected by the polygon mirror 7, the light beams travel to pass scanning lenses 8C, 8K, 10C, and 10K, which act on the light beams to form a plurality of beam spots on the scanning surfaces 11C and 11K. Hence the scanning surfaces 11C and 11K are scanned by the beam spots in multibeam optical scanning.

Figure 3:
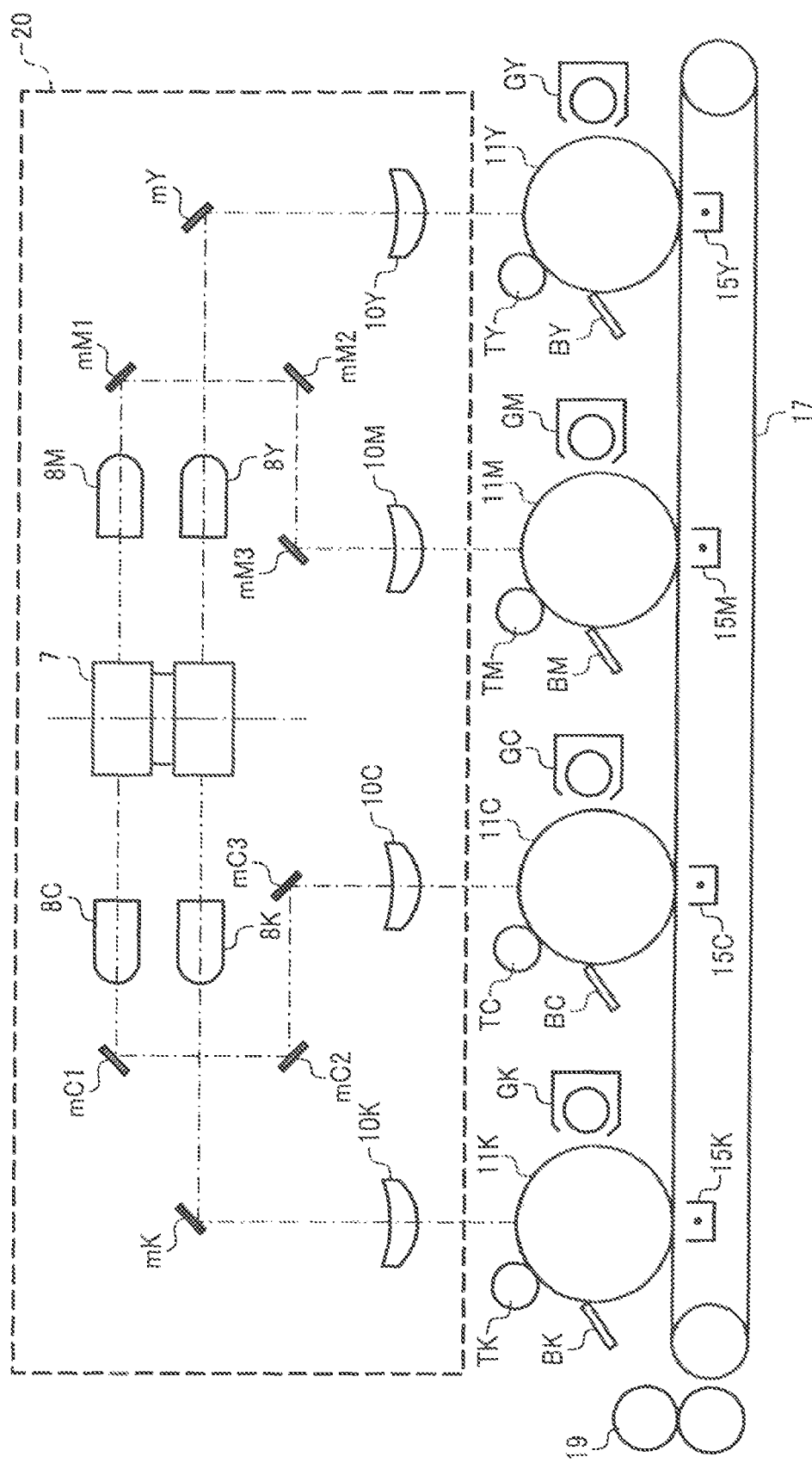
FIG. 3 is a schematic diagram of a tandem image forming apparatus using the optical scanning device of FIG. 2.

FIG. 3 depicts a configuration of an image forming apparatus using the optical scanning device of FIG. 2. The portion denoted by reference numeral 20 in FIG. 3 corresponds to "the multibeam optical scanning device" described in FIG. 2.

The polygon mirror 7 has four deflecting reflection surfaces, and is of a two-tier structure as shown in FIG. 3. One of light beams deflected at the upper tier of the polygon mirror 7 is guided through a light path bent by light path bending mirrors mM1, mM2, and mM3 to the photosensitive drum 11M. The other light beam is guided through a light path bent by light path bending mirrors mC1, mC2, and mC3 to the photosensitive drum 11C.

One of light beams deflected at the lower tier of the polygon mirror 7 is guided through a light path bent by a light path bending mirror mY to the photosensitive drum 11Y. The other light beam is guided through a light path bent by a light path bending mirror mK to the photosensitive drum 11K.

Four photosensitive drums 11Y, 11M, 11C, and 11K are thus subjected to multibeam optical scanning by light beams from four multibeam light sources 1Y, 1M, 1C, and 1K. All photosensitive drums 11Y to 11K are rotated clockwise at constant velocity, are uniformly charged by charging rollers TY, TM, TC, and TK, which serve as charging units, and are scanned by the corresponding light beams to write in an yellow image, magenta image, cyan image, and black image on the photosensitive drums, respectively, where the corresponding electrostatic latent images (photographic negative latent images) are formed.

These electrostatic latent images are developed in reverse by developing devices GY, GM, GC, and GK to form an yellow toner image, a magenta toner image, a cyan toner image, and a black toner image on the photosensitive drums 11Y, 11M, 11C, and 11K, respectively.

These toner images of respective colors are transferred onto "a printing sheet" (not shown). The printing sheet is conveyed by a conveyance belt 17. To the printing sheet, the yellow toner image is transferred from the photosensitive drum 11Y by a transfer unit 15Y, and the magenta toner image, cyan toner image, and black toner image are transferred sequentially from the photosensitive drums 11M, 11C, and 11K by the transfer units 15M, 15C, and 15K, respectively.

In this manner, the yellow, magenta, cyan, and black toner images are superimposed together on the printing sheet to form a synthesized color image. This color image is fixed by a fixing device 19 to the printing sheet to complete a color image. The toner images formed on the photosensitive drums can be superimposed together on an intermediate transfer belt to form a color image and transfer and fix the color image to the printing sheet.

In FIG. 3, the scanning lenses 8Y and 8M, on which a light beam deflected to the right from the polygon mirror 7 is incident, are separated from each other, but the scanning lenses 8Y and 8M can be stacked together into a two-tier structure. The scanning lenses 8C and 8K, on which a light beam deflected to the left from the polygon mirror 7 is incident, can also be stacked together into a two-tier structure.

In the above embodiment, the optical member 12 is constructed by integrating together an aperture and a phase adjusting element as described in FIG. 1.

As described above, the aperture is used to efficiently suppress the fluctuation of a beam spot size, carrying out beam shaping. When the aperture is provided, however, light diffraction at the aperture affects the beam profile of a beam spot, turning the beam profile to "a profile accompanying a side lobe".

If the phase adjusting element is also used, "light diffraction also occurs at the phase adjusting element". As a result, the beam profile of the beam spot on a light beam focusing surface is "formed as a beam profile under the complex effect of light diffraction by the aperture and light diffraction by the phase adjusting element". The beam profile of the beam spot, therefore, can be changed by changing a phase distribution of the phase adjusting element. Utilizing this fact, "an increase in a beam spot size can be suppressed and the shrinkage of a depth allowance can be lessened or prevented".

In the above embodiment, the multibeam light source 1 includes an array of light-emitting sources.

Figure 4:
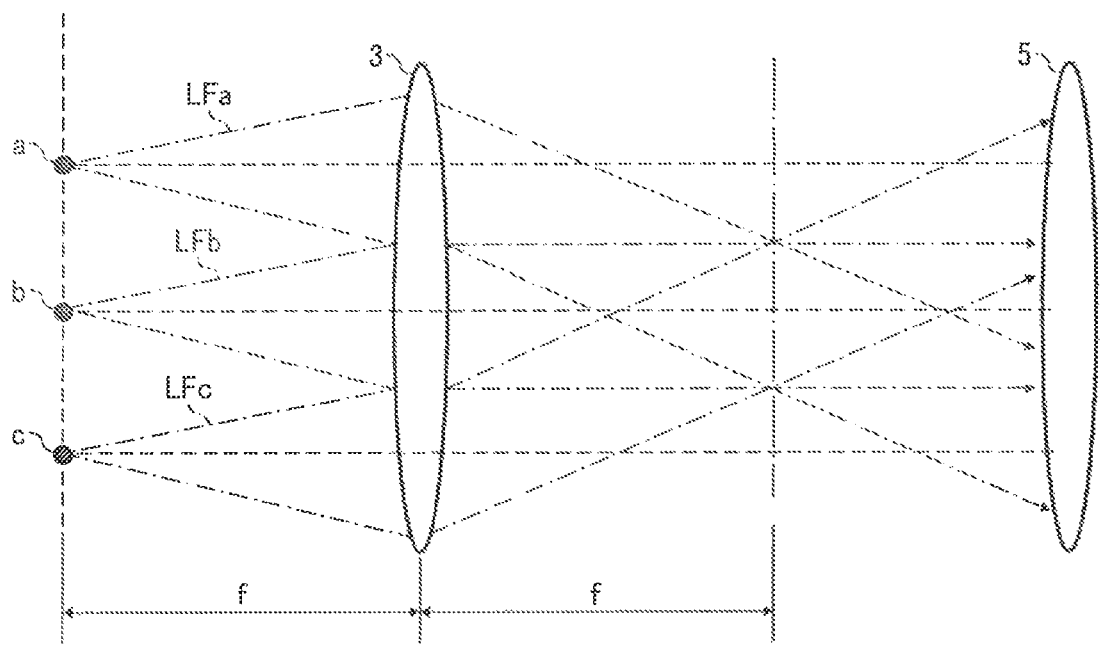
FIG. 4 is a schematic diagram representing a simplified relation between a multibeam light source, a collimating lens, and a cylinder lens shown in FIG. 1.

FIG. 4 depicts the simplified "relation between a multibeam light source, a collimating lens, and a cylinder lens". FIG. 4 is an explanatory view of a state where three light-emitting sources a, b, and c of the multibeam light source are arrayed at the equal interval on the same plane, and light beams LFa, LFb, and LFc, which are diverging light beams emitted from the light-emitting sources a, b, and c, are collimated by the collimating lens 3, and are incident on the cylinder lens 5.

The collimating lens 3 has a focal length f, and a front focal plane of the collimating lens 3 coincides with an array plane of the light-emitting sources a, b, and c. The light beams LFa, LFb, and LFc emitted from the light-emitting sources a, b, and c are turned to parallel beams by the collimating lens 3, cross each other at the position of a back focal plane of the collimating lens 3, as shown in FIG. 4, and then fall onto the cylinder lens 5. In FIG. 4, the vertical direction represents the sub scanning direction.

Though an aperture is not shown in FIG. 4, the aperture is disposed at the position of the back focal plane of the collimating lens 3. Because three light beams LFa, LFb, and LFc cross each other at the back focal plane position, matching the opening of the aperture to this position and carrying out beam shaping enables uniform shaping of the light beams LFa, LFb, and LFc.

Though not shown in FIG. 4, the center of opening of the aperture coincides with the optical axis of the collimating lens 3, and the center of a phase adjusting element (not shown) is positioned to also coincide with the optical axis.

A case where the phase adjusting element is disposed to be, for example, separated from the back focal plane of the collimating lens 3 toward the cylinder lens 5 is assumed. In this case, because "the beam profile of a beam spot is "formed under the complex effect of light diffraction by the aperture and light diffraction by the phase adjusting element", as described above, a change in the relative center positions of the aperture and the phase adjusting element results in a change in the beam profile of the beam spot.

When the multibeam light source is used, the optical beams LFa, LFb, and LFc individually proceed in different directions after passing through the collimating lens 3, as shown in FIG. 4. Because of this, if the aperture and the phase adjusting element are disposed to be separated from each other in the optical axis direction, as described above, "the center positions of the aperture and the phase adjusting element are not shifted to each other" for the optical beam LFb coinciding with the optical axis of the collimating lens 3, but "the center positions of the aperture and the phase adjusting element are shifted to each other" for the optical beams LFa and LFc.

As a result, the beam profiles and beam spot sizes of beam spots formed by the optical beams LFa and LFc become different from that of a beam spot formed by the optical beam LFb. This has a negative effect on the quality of an output image. To avoid such a situation, it is preferable that the phase adjusting element be brought extremely closer to the aperture in the direction of optical axis of the collimating lens 3 or be joined to the aperture to form an integrated structure, such as the optical member 12 of the embodiment of FIG. 1.

As described in FIG. 4, the LFa, LFb, and LFc cross each other at the position of the back focal point of the collimating lens 3. Because a light beam emitted from a laser light source usually has "a Gaussian light intensity distribution", if the aperture is disposed at "a position other than the position of the back side focal plane" of the collimating lens 3, "light intensity distributions at the time of the light beams passing through the opening of the aperture (light intensity distribution at the aperture opening)" becomes different between the light beam LFa and the light beams LFb and LFc. The beam profiles of beams spots formed by these light beams, therefore, become different from each other.

This point will be described in detail using a simulation result.

In a simulation case, plane light wave having uniform light intensity (i.e., light spreading indefinitely) is incident on an aperture, and a light beam having passed through the opening of the aperture is focused through a focusing lens into a beam spot. In this case, the size of the diameter of this beam spot is defined as one, which is determined to be a normalized beam spot size. The aperture is disposed at the position of a front focal plane of the lens.

Then, a light beam having a Gaussian light intensity distribution is introduced into the simulation case, where light intensity at the end of the aperture opening is changed. This means that the beam diameter of the light beam incident on the aperture opening is changed.

Figure 5:
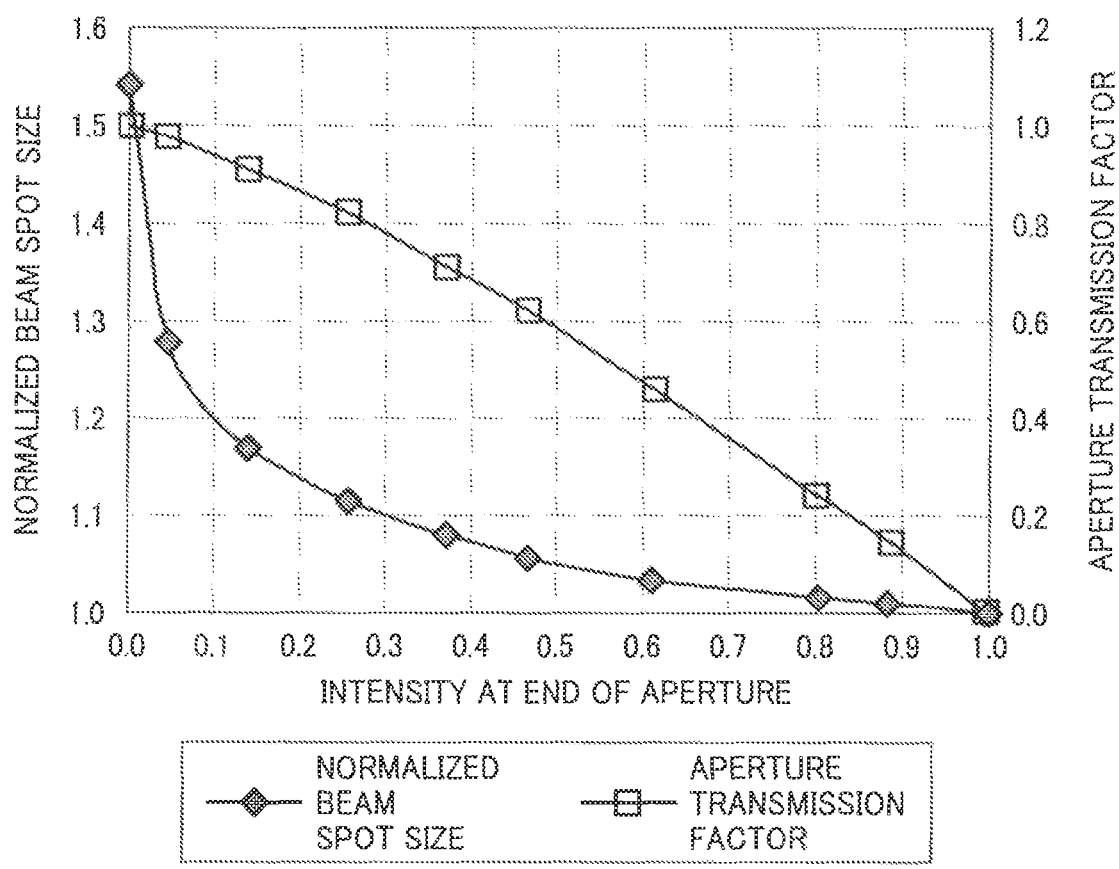
FIG. 5 is a graph representing a result of simulation of a change in a beam spot size that results when light intensity at the end of an aperture opening is changed.

A change in a beam spot size (called "normalized beam spot size") that results when "light intensity at the end of the aperture opening" is changed is examined in simulation, and a graph shown in FIG. 5 is obtained. In FIG. 5, "solid diamond" represents "normalized beam spot size".

A change in the quantity of light passing through the aperture opening (called "aperture transmission factor") that results when "light intensity at the end of the aperture opening" is changed is examined in simulation, and a light quantity change represented by "hollow square" in FIG. 5 results.

According to the graphic curve of "normalized beam spot size", when light intensity at the end of the aperture opening becomes smaller than $1/e^2$ (which is represented by the horizontal axis coordinate position as 0.135 when the peak intensity is determined to be 1), the beam spot size of the beam spot formed at the lens focal point increases sharply, which gives the graphic curve a steep upward gradient. The steep gradient of the graphic curve means that "the fluctuation of the beam spot size becomes large due to a light intensity difference at the end of the aperture opening".

When the multibeam light source is used, each light beam has different light intensity at the end of the aperture opening (because, at the aperture, the sectional area of the light beam LFb incident on the aperture at the right angle is different from the sectional areas of the light beams LFa and LFc incident diagonally on the aperture). When the gradient of the graphic curve of the normalized beam spot size gets steeper, therefore, the beam spot sizes of the beam spots formed at the lens focal plane position do not become the same. This has a negative effect on an image.

To avoid such a situation, light intensity at the end of the opening of the aperture "should preferably be determined to be larger than $1/e^2$ for all light beams." In other words, parameters should preferably be set to satisfy the following inequality.

$$w > (a + |x \times d/f|) \tag{1}$$

where "d" is distance from the center position of a plurality of light-emitting sources of the multibeam light source to a light-emitting source located farthest from the center position, "f" is focal length of the collimating lens, "x" is distance from the back focal point of the collimating lens to the phase adjusting element, "a" is opening diameter of the aperture, "w" is beam diameter on the aperture (defined by $1/e^2$). The unit of the parameters is "millimeter".

A condition is set that substantial parallel beams (parallel beams, or weak parallel beams, or weak diverging beams that are regarded as parallel beams) are emitted from the collimating lens, and that the aperture and the phase adjusting element are disposed to be extremely close to each other.

Usually, different values are set for each of "a" and "w" of the above inequality according to a difference between the main scanning direction and the sub scanning direction, but the same value can be set. The above inequality (1) is effective when it is satisfied at least either in the main scanning direction or the sub scanning direction. Nevertheless, the inequality (1) should preferably be satisfied both in the main scanning direction and the sub scanning direction.

The larger the light intensity at the end of the aperture opening is, the smaller "the dispersion of beam spot sizes" between a plurality of beam spots for multibeam optical scanning is. At this time, however, the aperture transmission factor drops to lower light use efficiency, which is disadvantageous for high-speed scanning.

According to the graphic curve of "the normalized beam spot size" of FIG. 5, when the light intensity at the end of the aperture opening becomes larger than 0.5, the gradient of the graphic curve hardly changes, which means that "the dispersion of beam spot sizes" in multibeam optical scanning is hardly improved. The light intensity at the end of the aperture opening, therefore, should preferably be determined to be "larger than $1/e^2$ (0.135) and smaller than 0.5". In other words, the parameters should preferably be set to satisfy the following inequality (2).

$$(a + |x \times d/f|) < w < 0.5 \times e^2 \times (a + |x \times d/f|) \tag{2}$$

The inequality (2) should preferably be satisfied at least either in the main scanning direction or the sub scanning direction, and more preferably be satisfied both in the main scanning direction and the sub scanning direction.

Because the gradient of the graphic curve is rather large in a "range of $1/e^2$ (0.135) to $2/e^2$ (0.27)", the light intensity at the end of the aperture opening should more preferably be in "a range of $2/e^2$ to 0.5". This means that the inequality (3) $2(a + |x \times d/f|) < w < 0.5 \times e^2 \times (a + |x \times d/f|)$ should preferably be satisfied at least either in the main scanning direction or the sub scanning direction, and more preferably be satisfied both in the main scanning direction and the sub scanning direction.

Setting each parameter to satisfy the inequality (1), preferably the inequality (2), and more preferably the inequality (3) suppresses a difference in the beam profiles or beam spot sizes of beam spots between a multiple of light beams to a small level on a scanning surface, thus enables highly quality image output.

The variable "x" in the above inequality can be a positive value (closer to the scanning surface than the position of the back focal point of the collimating lens) or can also be a negative value (closer to the light source than the position of the back focal point of the collimating lens). To expand the depth allowance, the variable "x" should preferably be a negative value.

Figure 6A:
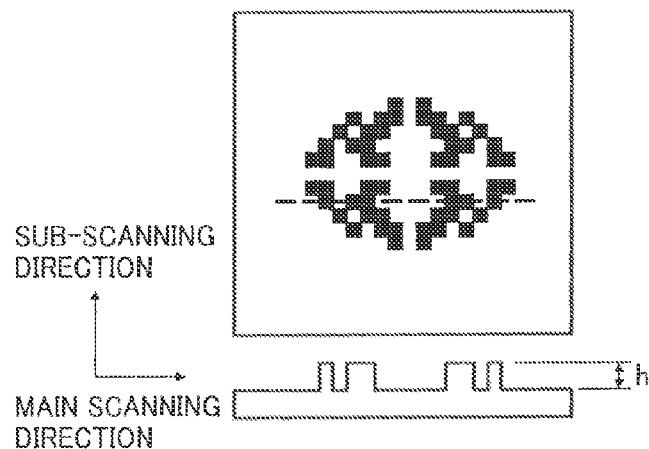
FIGS. 6A to 6D are schematic diagrams of four examples of phase adjusting elements (four patterns of phase distribution)
Figure 6B:
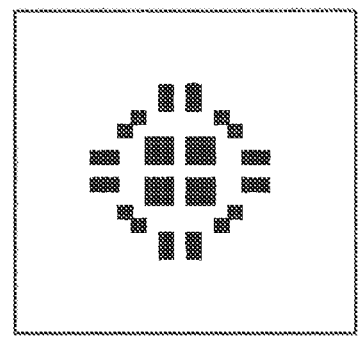
Figure 6C:
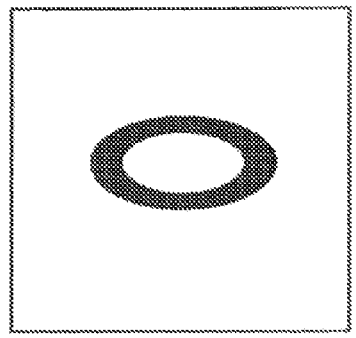
Figure 6D:
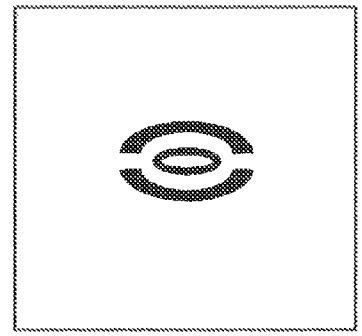

FIGS. 6A to 6D depict four patterns of "phase distribution" on phase adjusting elements. A pattern of phase distribution can be "a pattern of a two-dimensional combination of minute rectangles", as shown in FIGS. 6A and 6B, and can be "a pattern with a smooth outline", as shown in FIGS. 6C and 6D.

A lower figure of FIG. 6A depicts the sectional shape of an upper figure of FIG. 6A along a broken line on the upper figure. Each of four phase adjusting elements is "a transparent parallel plate", has a uniform refraction factor, and is given a phase distribution by changing the height of one surface of the phase adjusting element in the thickness direction. The phase distribution, therefore, is given as "the two-dimensional distribution of thickness of the phase adjusting element".

In determining "the height of the surface" that forms the phase distribution, a phase must be determined to be a value other than $2n\pi$ (n is an integer) at an operation wavelength $\lambda$, and should preferably be determined to be $(2n+1)\pi$ (n is an integer). In "a height distribution" making up the phase distribution, the height denoted by "h" is uniform.

A phase difference θ (rad) given by the phase distribution is given by the equation:

$$\theta = 2\pi(N-1)h/\lambda$$

where N is the refraction factor of the material of the phase adjusting element, λ is the operation wavelength, and h is the height. The refraction factor N is determined depending on the material of the phase adjusting element, and the operation wavelength λ is determined as a design condition depending on the multibeam light source. Thus, the height h of phase distribution is set so that the phase difference is determined to be a value other than $\theta = 2n\pi$ (n is an integer), preferably, to be $\theta = (2n+1)\pi$ (n is an integer).

In the example described above, the height h giving the phase distribution is a uniform value, and the phase distribution given to a light beam includes two stages of distribution consisting of a stage of phase θ (any value other than $2n\pi$ (n is an integer) is acceptable, but $(2n+1)\pi$ is preferable) and a stage of phase zero. The phase difference $\theta = (2n+1)\pi$ is preferable, but the height of phase distribution can be set as three or more stages of heights (e.g., four stages of heights that give a phase of zero, π/4, π/2, and 3π/2). Besides, the height h can be caused to change continuously in correspondence to the position of a phase distribution pattern. This expands a degree of freedom in designing the phase distribution, which is preferable.

The beam profile of a beam spot formed on the scanning surface should preferably be "a shape symmetrical" with regard to the main scanning direction and to the sub scanning direction. A phase distribution pattern on the phase adjusting element, therefore, should preferably be set as a pattern having "a height distribution that is axisymmetric" with regard to a straight line passing through the center of the phase adjusting element and being parallel with the main scanning direction and to a straight line passing through the center and being parallel with the sub scanning direction, as shown in FIG. 4.

Because a focusing magnification rate in the main scanning direction is different from that in the sub scanning direction, the phase distribution pattern should preferably be set separately in the main scanning direction and in the sub scanning direction.

Form the viewpoints of the above description, as shown in FIGS. 6A, 6C, and 6D, a pattern having symmetries in the main scanning direction and sub scanning direction that are different from each other is preferable. The pattern of FIG. 6A affords a large degree of freedom in designing a two-dimensional pattern, and, therefore, is particularly preferable.

Such phase adjusting elements as shown in FIGS. 6A to 6D are usually manufactured by forming a phase distribution pattern of an irregular structure on the surface of a transparent parallel plate. Because the part of surface that is other than the phase distribution pattern is a flat surface, surface reflection occurs on the phase adjusting element. This raises a concern that light reflected on the surface may return to the light-emitting source of the multibeam light source to destabilize laser oscillation by the light-emitting source, causing emission intensity fluctuation, thus giving a negative effect to an image.

To prevent this from happening, a reflection preventive film can be formed on at least either of the incident surface and the emission surface of the phase adjusting element, or "a reflection preventive structure that is a microstructure finer than the wavelength" can be formed on at least either of the incident surface and the emission surface of the phase adjusting element. It is preferable, on the other hand, that the phase adjusting element be disposed to be slightly tilted against the face of the collimating lens that is perpendicular to the optical axis".

The phase adjusting element can be provided as a single independent optical element. Providing the phase adjusting element as a single element, however, means that two surfaces of the phase adjusting element are added to the number of surfaces of optical elements arranged between the light source of the multibeam optical scanning device and the scanning surface, and the effect of reflection at the surface of the phase adjusting element lowers light use efficiency in multibeam optical scanning. As described above, disposing the reflection preventive film on the surface of the phase adjusting element to reduce or prevent reflection at the surface of the phase adjusting element is one of countermeasures against a drop in the light use efficiency. A drop in the light use efficiency, on the other hand, can also be suppressed by structurally integrating the phase adjusting element with another optical element (e.g., collimating lens or cylinder lens).

Figure 7:
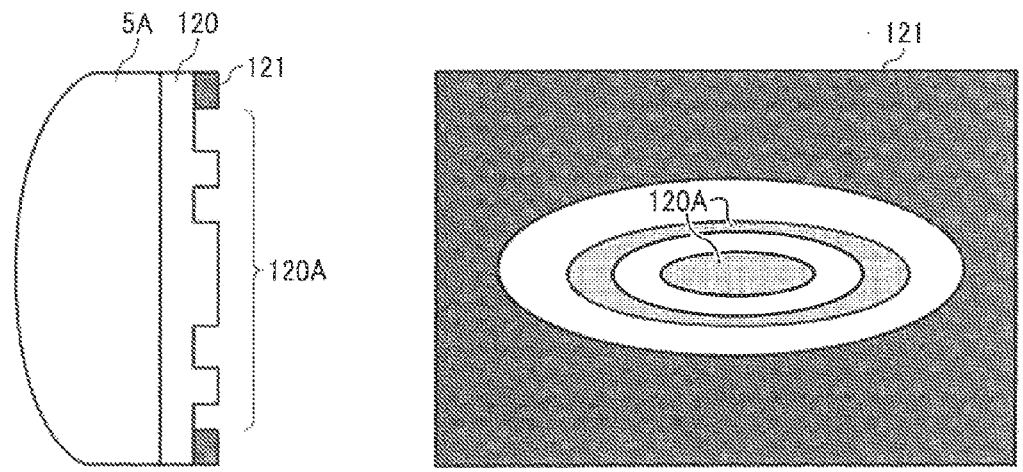
FIG. 7 is a schematic diagram of one example in which the phase adjusting element, the aperture, and the cylinder lens are integrated together.

FIG. 7 depicts one embodiment according to which the phase adjusting element, the aperture, and the cylinder lens are integrated together. A left figure of FIG. 7 is an explanatory view of the sectional shape of the integrated structure, and a right figure of FIG. 7 is an explanatory view of the cylinder lens that is seen in the optical axis direction.

In the left figure of FIG. 7, the cylinder lens denoted by reference numeral 5A is a convex-flat lens that has a left lens surface formed into a convex cylindrical surface, and a right lens surface formed into a flat surface. Reference numeral 120 denotes the phase adjusting element, and reference numeral 121 denotes the aperture. The phase adjusting element 120 is a transparent parallel plate, and has a left surface formed into a flat surface, and a right surface where a phase distribution is formed as "a pattern having a given height from a flat surface portion". The flat surface of the phase adjusting element 120 is glued to the flat lens surface of the cylinder lens 5A to integrate together the phase adjusting element 120 and the cylinder lens 5A. The aperture 121 is formed on the surface of the phase adjusting element 120 where the phase distribution is formed.

The phase distribution pattern 120A of the phase adjusting element 120 is "a concentric elliptical shape" similar to the pattern of FIG. 6D. In line with this, the opening shape of the aperture 121 is also an elliptical shape (that is elongated in the main scanning direction).

Another possible method for integrating together the phase adjusting element and the cylinder lens is a method of directly forming "an irregular structure corresponding to a phase distribution" on a lens surface of the cylinder lens. In carrying out this method, a resin lens is adopted as the cylinder lens, and "the irregular structure corresponding to the phase distribution" is formed in advance on a molding die for molding the resin cylinder lens so that the phase adjusting element is formed integrally on a lens surface of the cylinder lens when it is molded. The surface of the cylinder lens where the phase adjusting element is integrally formed can be the flat lens surface, but the irregular structure can be formed on the cylindrical surface of the cylinder lens.

Methods for integrating the aperture 121 with the phase adjusting element 120 includes a method of gluing the aperture 121 made as a separate resin member, etc., to the phase adjusting element, and a method of forming "a material having a shielding effect", such as a chromium and a black organic material, on the phase adjusting element 120 by vapor deposition or printing. The methods are also useful when the aperture 121 is integrated with the cylinder lens 5A.

In the embodiment of FIG. 7, the aperture 121 is integrated with the phase adjusting element 120, but the aperture 121 can be integrated with a lens surface (flat lens surface or convex cylindrical surface) of the cylinder lens 5A. In other words, the order of arrangement of the cylinder lens, phase adjusting element, and aperture is determined at will. In the embodiment of FIG. 7, the incident side of a light beam from the light source is the left side on the left figure of FIG. 7, in which case the light beam is incident on the cylinder lens 5A and passes the phase adjusting element 120 and the aperture 121. Contrary to that, the incident side of a light beam can be determined to be the right side in the left figure of FIG. 7, in which case the light beam having passing through the aperture 121 and the phase adjusting element 120 passes the cylinder lens 5A.

In setting the positional relation between the collimating lens and the cylinder lens, given the focal point distance f of the collimating lens, the distance between the collimating lens and the cylinder lens should preferably be determined to be "smaller than 2f". This makes "the distance between the centers of light beams emitted from light-emitting sources of the multibeam light source" smaller "on the cylinder lens" than the distance on the light source. As a result, "a difference in the intensity distributions of beams passing through the aperture" between the light-emitting sources is reduced, and a difference in the beam profiles of a plurality of beam spots formed on the scanning surface is reduced.

In the embodiment of FIG. 7, when the left side on the left figure of FIG. 7 is the incident side, if the position of light beams incident on the cylinder lens 5A shifts due to the effect of errors in manufacturing or mounting the multibeam light source and collimating lens, the intensity distributions of the light beams passing through the aperture 121 change from the design-based intensity distributions, which degrades the beam profiles of beam spots to cause "beam diameter dilution".

To deal with such a situation, the cylinder lens is set adjustable in the plane perpendicular to the optical axis of the cylinder lens. In this setup, the light beams are caused to fall onto a proper location on the cylinder lens regardless of errors in manufacturing or mounting the multibeam light source and collimating lens.

While "the case of integrating together the aperture, phase adjusting element, and cylinder lens" is described above in FIG. 7, the aperture does not always need to be integrated. The aperture can be provided as a separate member and disposed near an integrated structure composed of the phase adjusting member and the cylinder lens. Such an aperture offers the same effect as described above.

Figure 8:
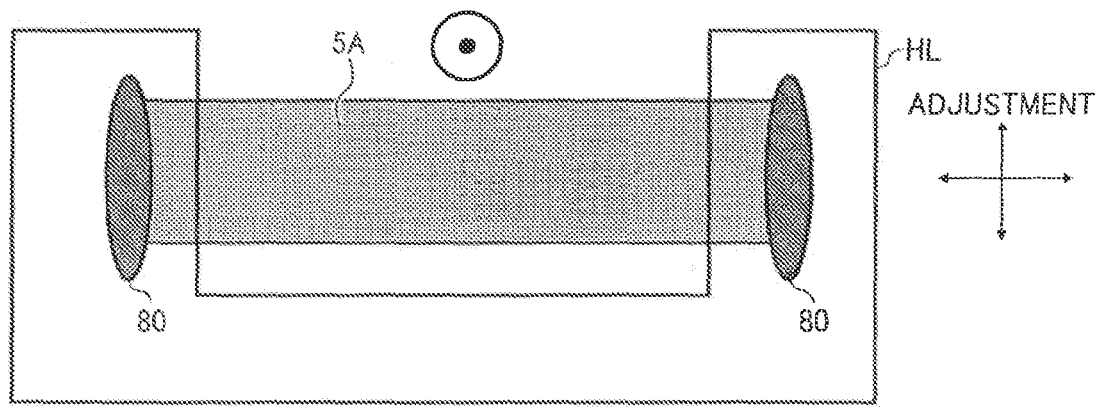
FIG. 8 is a schematic diagram for explaining a case where the cylinder lens integrated with the phase adjusting element and the aperture of FIG. 7 is adjusted in a plane that is perpendicular to the optical axis of the cylinder lens.

FIG. 8 is an explanatory view of a case where the cylinder lens 5A integrated with the phase adjusting element 120 and the aperture 121 of FIG. 7 is adjusted in a plane that is perpendicular to the optical axis of the cylinder lens (direction perpendicular to the plane of FIG. 8). The cylinder lens 5A is adjusted two-dimensionally in the plane perpendicular to the optical axis while kept "butted against a holding member HL in the optical axis direction", and then is fixed to the holding member HL with an adhesive 80. The holding member HL should preferably be configured to be capable of shifting in the optical axis direction so as to adjust a focusing position in the main scanning direction and sub scanning direction.

While the case of integrating the phase adjusting element and aperture with the cylinder lens is described above, the phase adjusting element can be integrated with the collimating lens.

Such a configuration suppresses a drop in light use efficiency. Because the collimating lens is close to the multibeam light source, the position of light beams from light-emitting sources incident on the aperture becomes "less changeable in time-dependent change" when the collimating lens is integrated with the phase adjusting element, which suppresses a time-dependent change in the beam profiles of beam spots.

One of methods of integrating the collimating lens with the phase adjusting element is a method of forming "an irregular structure equivalent to a phase distribution" on a lens surface of the collimating lens. In carrying out this method, a resin lens is adopted as the cylinder lens, and the irregular structure is formed in advance on the surface of a molding die so that the irregular structure is transferred directly to the lens surface when the collimating lens is molded.

In carrying out another method of integration, the phase adjusting element can be glued to the lens surface of the collimating lens. In this case, the collimating lens can have a flat surface portion, to which the phase adjusting element is glued. The phase adjusting element can also be joined integrally to the lens surface having a radius of curvature.

Methods for integrating the aperture with the phase adjusting element or the collimating lens includes a method of gluing the aperture made as a separate resin member, etc., to the phase adjusting element or the collimating lens, and a method of forming "a material having a shielding effect", such as a chromium and a black organic material, on the phase adjusting element or the collimating lens by vapor deposition or printing.

While "the case of integrating together the aperture, phase adjusting element, and collimating lens" is described above, the aperture does not always need to be integrated. The aperture can be provided as a separate member and disposed near an integrated structure composed of the phase adjusting member and the collimating lens. Such an aperture offers the same effect as described above.

The relative positions of the multibeam light source and the collimating lens may shift due to the effect of a manufacturing error on members and places for arranging the multibeam light source and the collimating lens. To deal with this problem, the collimating lens should preferably be set adjustable in position relative to the multibeam light source "in a plane perpendicular to the optical axis of the collimating lens". In this setup, the relative positions of the multibeam light source and the collimating lens can be corrected even if a manufacturing error on members and places for arranging the multibeam light source and the collimating lens exists. Thus, diverging light beams from multibeam light source can be collimated properly through the collimating lens.

Figure 9:
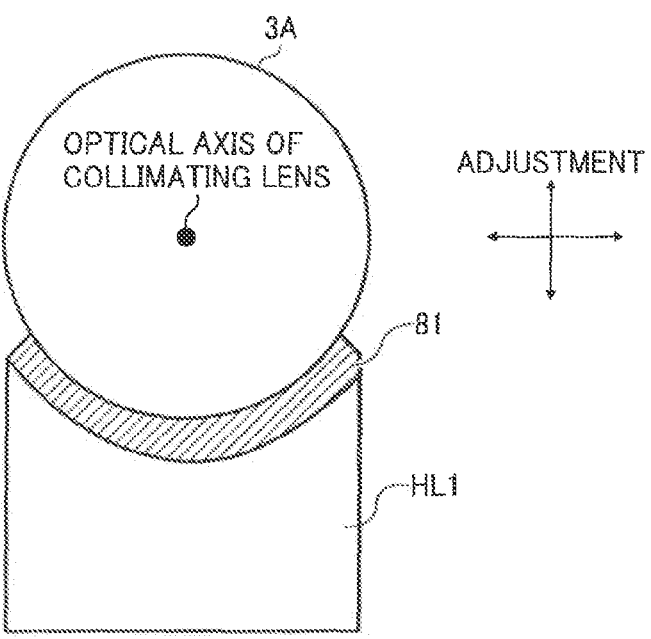
FIG. 9 is a schematic diagram of a case where the collimating lens integrated with the phase adjusting element and the aperture is adjusted in a plane that is perpendicular to the optical axis of the collimating lens.

FIG. 9 depicts a case where a collimating lens 3A integrated with the phase adjusting element and the aperture is adjusted in a plane that is perpendicular to the optical axis of the collimating lens. A gap between a holding member HL1 and the collimating lens 3A is filled with a photocuring adhesive (e.g., "ultraviolet curing resin") 81, and the collimating lens 3A is adjusted two-dimensionally in the plane perpendicular to the optical axis of the collimating lens 3A and then is exposed to curing light to cure a photocuring adhesive 81. At this time, the collimating lens 3A is adjusted also in the optical axis direction to adjust the focusing position.

In the multibeam optical scanning device, at least one optical plane of at least either of the collimating lens and the cylinder lens can be a discontinuous plane, on which a phase difference on a discontinuous portion is determined to be "integer multiple of $2\pi$ at an operation wavelength". This means that at least one optical plane of at least either of the collimating lens and the cylinder lens should preferably be provided as "a diffraction lens surface".

Usually, one or more resin lenses are disposed on a light path leading from the multibeam light source to the scanning surface. It is a well known fact that the lens power of a resin lens fluctuates depending on a temperature change, that is to say, the lens power of the resin lens usually shrinks with an increasing temperature. Meanwhile, the wavelength of laser light emitted from the multibeam light source shifts toward the long wavelength band with an increasing temperature.

At a diffraction lens surface, the power of the lens surface is determined by a diffraction effect and a refraction effect. A growth in the wavelength of a light beam due to a temperature change leads to an increase in a diffraction angle at the diffraction lens surface, and this increasing diffraction angle offsets the shrinkage of the lens power. Adopting a diffraction lens, therefore, suppresses the fluctuation of a focal point position caused by temperature fluctuation. In addition, adopting the diffraction lens facilitates integration of the collimating lens or the cylinder lens with the phase adjusting element to achieve cost cutdown.

The diffraction lens will then be described. FIGS. 10A to 10C depict "the structure of a conventionally known diffraction lens". FIG. 10A depicts a structure that is given by dividing "a convex lens surface shape" of a conventional flat-convex lens into ring bands, and shaping each ring band to give it a height "h". FIG. 10B depicts a structure that is given by approximating the sectional shape of the ring band portion of FIG. 10A with a straight line contour into a serrated shape. FIG. 10C depicts a structure that is given by approximating the sectional shape of the ring band portion of FIG. 10A with a stepped shape.

In the structures shown in FIGS. 10A to 10C, the diffraction lens surface has power, being capable of focusing an incident light beam. If a concave lens surface is provided as the diffraction lens surface, such a diffraction lens surface is capable of diverging an incident light beam.

FIG. 11 depicts a case where the diffraction lens surface does not have power. The diffraction lens of this case has one surface that is a flat surface, and another surface where ring bands are "formed into a stepped shape on a plane perpendicular to the optical axis of the lens". The ring band height "h" in FIGS. 10A to 10C and 11 is set to give "a phase difference integer times as large as $2\pi$" between ring bands adjacent to light having an operation wavelength that passes the diffraction lens surface. A lens used for the multibeam optical scanning device may have "magnification rates in the main scanning direction and the sub scanning direction that are different from each other". In this case, ring bands should most preferably be formed into "a concentric elliptical shape". Ring bands can be formed into a concentric shape while a magnification rate difference between the main scanning direction and the sub scanning direction is achieved by the shape of the lens surface.

When the diffraction surface is formed on both collimating lens and cylinder lens, ring bands on the collimating lens are formed into a concentric shape while ring bands on the cylinder lens are formed into a linear shape. This makes the effect of the diffraction lens surfaces of these lenses equal to the effect of "the diffraction lens surface using concentric elliptical ring bands".

Adopting the diffraction lens having the diffraction lens surface not only suppresses the fluctuation of a focal point position caused by temperature fluctuation, but also facilitates integration of the collimating lens or the cylinder lens with the phase optical element, thus achieves cost cutdown.

As described above, the phase adjusting element can be integrated with the collimating lens or the cylinder lens. When the collimating lens or the cylinder lens is used as the diffraction lens, ring bands on the diffraction lens surface are formed into a concentric shape, a phase distribution pattern on the phase adjusting element is formed into "a single ring or concentric rings", and "a discontinuous portion" is formed on the diffraction lens surface. In this configuration, "the diffraction lens and the phase adjusting element can be integrated" so that a phase difference between the discontinuous portion and a peripheral portion is integer multiple of $2\pi$ at an operation wavelength.

FIGS. 12A to 13C depict examples of diffraction lenses in the above case.

Figure 14:
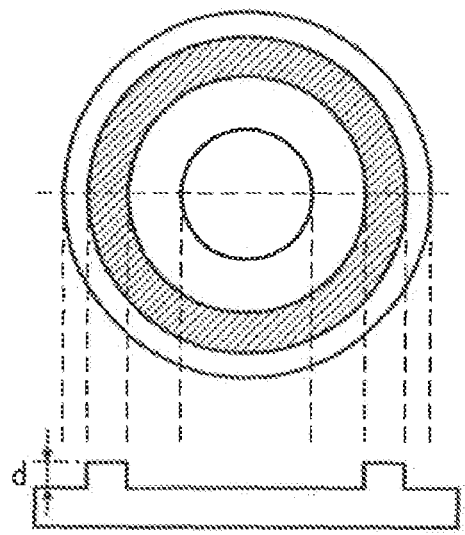
FIG. 14 is a schematic diagram illustrating the shape of a phase adjusting element that is assumed to be integrated with the diffraction lens of FIGS. 10A to 10C in making the diffraction lens of FIGS. 12A to 12C.

FIG. 12A to 12C depict examples in each of which a phase corresponding to a height d is added as "a phase distribution pattern" to "the second ring band (ring band marked with oblique lines) from the inside (optical axis side)" on the diffraction lens surface of the diffraction lens of FIGS. 10A to 10C. FIG. 14 depicts the shape of "a phase adjusting element that is assumed to be integrated with the diffraction lens of FIGS. 12A to 12C".

"A ring portion marked with oblique lines" shown in an upper figure of FIG. 14 is the phase distribution pattern having "a circular ring shape", and a lower figure of FIG. 14 depicts the sectional shape of the phase distribution pattern. The height d is set so that "a phase difference between a discontinuous portion (the second ring band from the optical axis side in FIG. 12A to 12C) and a peripheral portion (the first ring band and the third ring band from the optical axis side) is the phase difference corresponding to the height d (phase difference other than $2\pi n$ (n is an integer), preferably phase difference $(2n+1)\pi$) at an operation wavelength".

Figure 15:
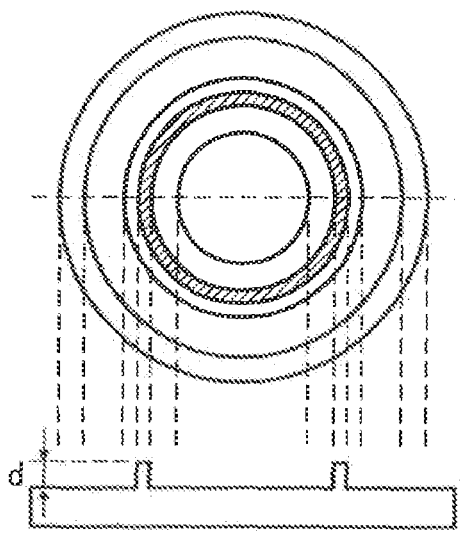
FIG. 15 is a schematic diagram illustrating the shape of a phase adjusting element that is assumed to be integrated with the diffraction lens of FIGS. 10A to 10C in making the diffraction lens of FIGS. 13A to 13C.

FIGS. 13A to 13C depict examples in each of which a phase corresponding to the height d is added as "a phase distribution pattern" to "a portion in the first ring band from the inside" on the diffraction lens surface of the diffraction lens of FIGS. 10A to 10C. FIG. 15 depicts the shape of "a phase adjusting element that is assumed to be integrated with the diffraction lens of FIGS. 13A to 13C".

"A ring portion marked with oblique lines" shown in an upper figure of FIG. 15 is the phase distribution pattern having "a circular ring shape", and a lower figure of FIG. 15 depicts the sectional shape of the phase distribution pattern. The height d is set so that "a phase difference between a discontinuous portion (a ring band portion and the portion added as the phase distribution pattern in the second ring band from the optical axis side in FIG. 13) and the peripheral portion is the phase difference corresponding to the height d (phase difference other than $2\pi n$ (n is an integer), preferably phase difference $(2n+1)\pi$) at the operation wavelength.

While description is made of the above example in which the phase distribution pattern of the phase adjusting element coincides with "a ring band on the diffraction lens surface (FIGS. 12A to 12C)" and of the above example in which the phase distribution pattern is "included in one ring band on the diffraction lens surface (FIGS. 13A to 13C)", "the discontinuous portion" added to the diffraction lens surface as the phase distribution pattern can be added to "extend over a plurality of ring bands". These three cases of addition of the phase distribution pattern can be combined.

The diffraction lens surface is manufactured by cutting a die with a cutting tool into a desired shape and then molding a resin. Adopting the diffraction lens surface structures of FIGS. 12A to 12C and 13A to 13C allows the use of a highly reliable "manufacturing method identical with a conventional manufacturing method". This enables the achievement of a highly reliable optical element (diffraction lens having the phase adjusting function of the phase adjusting element), and offers an advantage of no cost increase in die fabrication.

While the diffraction lens structure of FIGS. 11A to 10C is described in FIGS. 12A to 13C as the diffraction lens that is integrated with the phase adjusting element, the phase adjusting elements of FIGS. 14 and 15 can be integrated with the diffraction lens structure of FIG. 11.

The phase distribution pattern of the phase adjusting element that is formed into "a circular ring shape" has been described, but the phase distribution pattern can be formed as the patterns that are set freely two-dimensionally, as shown in FIGS. 6A and 6B. These patterns, however, cannot be manufactured by "a method using a cutting tool", and is, therefore, manufactured by a method using dry etching, etc.

In the example of FIGS. 12A to 12C, for example, the height of the second ring band is changed to give other ring bands a phase difference. "Applying a new material" to only the second ring band or changing the refraction factor of the second ring band also enables "integration of the diffraction lens with the phase adjusting element".

In the above example, the phase adjusting element having two stages of height distributions has been described. As described above, the phase adjusting element can have a multiple of stages of continuous height distributions as the phase distributions or can have phase distributions of a plurality of concentric (ring) patterns. This improves a degree of freedom in designing.

While "circular ring bands" have been described as the diffraction lens surface of the diffraction lens, the ring bands can be formed as elliptical ring bands or linear ring bands. FIGS. 16A to 16C depict a diffraction lens with a diffraction lens surface having "a diffraction structure having power only in one direction", and FIG. 17 depicts a diffraction lens with a diffraction lens surface having "a diffraction structure not having power only in one direction". These diffraction lenses can be used as an element that is formed by integrating together the cylinder lens and the phase adjusting element.

These diffraction lens surfaces can be combined with "a one-dimensional or two-dimensional phase distribution" having the function of the phase adjusting element in the same manner as described above.

Expansion of a depth allowance through "phase adjustments by the phase adjusting element" will then be described.

The inventor has discovered "a method for expanding the depth allowance without increasing a beam spot size at high light use efficiency". The method is of increasing the peak intensity of a side lobe of the beam profile of a beam spot at the position of a focusing surface of a focusing optical system "to an extent that gives no problem to multibeam optical scanning", that is, designing a phase distribution on the phase adjusting element to "increase the peak intensity of the side lobe to the extent that gives no problem to multibeam optical scanning".

According to the method, the phase distribution on the phase adjusting element is set so that the following inequality is satisfied.

$$PS/PM > PS1/PM1 \tag{1}$$

where PS1 is peak intensity of a side lobe light and PM1 is peak intensity of a main lobe light in a light intensity profile (beam profile) of a beam spot on a focusing surface (design-based scanning surface) of the focusing optical system when the phase adjustments are not performed by the phase adjusting element, and PS is peak intensity of the side lobe light and PM is peak intensity of main lobe light in a light intensity profile on the focusing surface of the focusing optical system when the phase adjustments are performed by the phase adjusting element.

More preferably, the phase distribution on the phase adjusting element should be set so that the following inequality is satisfied.

$$PS2/PM2 > PSA/PMA \tag{2}$$

where PS2 is peak intensity of a side lobe light and PM2 is peak intensity of a main lobe light in a light intensity profile at a position other than the focusing surface of the focusing optical system when the phase adjustments are not performed by the phase adjusting element, and PSA is peak intensity of the side lobe light and PMA is peak intensity of the main lobe light in the light intensity profile at the position other than the focusing surface when the phase adjustments are performed by the phase adjustment element.

Furthermore, more preferably, the phase distribution on the phase adjusting element should be set so that the following inequality is satisfied.

$$PM1/PM2 > PM/PMA \tag{3}$$

where PM1 is peak intensity of a main lobe light at the focusing position on the optical axis of the focusing optical system and PM2 is peak intensity of the main lobe light at a position other than the focusing position when the phase adjustments are not performed by the phase adjusting element, and PM is peak intensity of the main lobe light in the light intensity profile of a beam spot at the focusing position on the optical axis of the focusing optical system and PMA is peak intensity of the main lobe light in the light intensity profile at "the position other than the focusing position" when the phase adjustments are performed by the phase adjusting element.

Satisfying the condition (1) is an essential condition for expansion of the depth allowance, so that the phase distribution on the phase adjusting element is set to satisfy the condition (1).

The greater an increase in the peak intensity of a side lobe is, "the greater the expansion of the depth allowance" is. An excessively heavy increase in side lobe light, however, triggers undesirable phenomena, such as production of "toner dust" around dots making up an image to be formed and developing of scumming. Besides, heavily increasing side lobe light causes main lobe light intensity to drop excessively, which can constitute a disadvantageous condition for high-speed multibeam optical scanning.

The peak intensity of the side lobe, therefore, should preferably be determined to be 13.5% or less, more preferably, to be 10% or less of the peak intensity of the main lobe.

Expansion of the depth allowance by phase adjustments will be described based on a simulation result.

Figure 18:
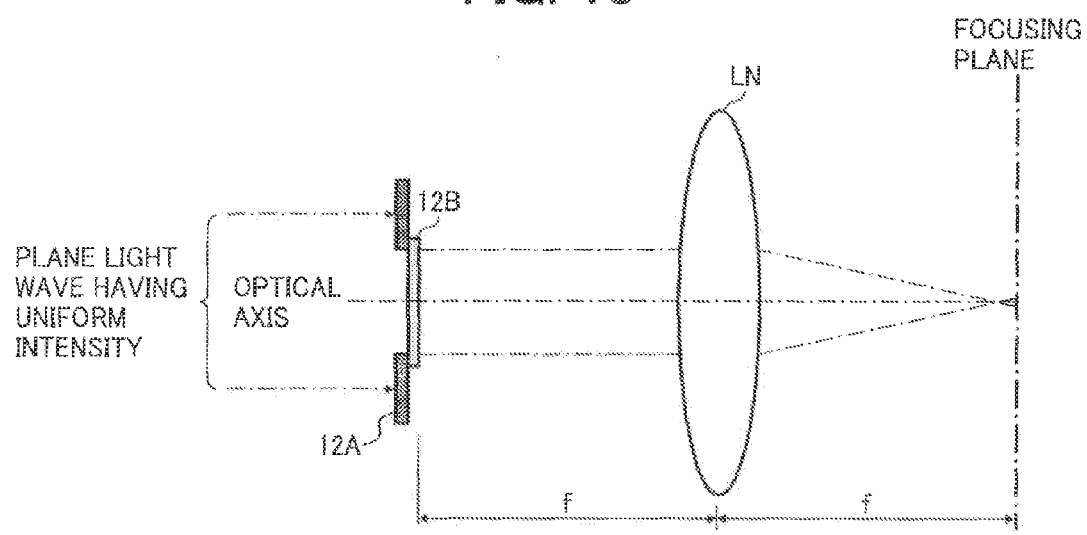
FIG. 18 is a schematic diagram of a simulation model for simulating the expansion of a depth allowance by phase adjustments.

FIG. 18 is an explanatory view of a simulation model.

In FIG. 18, reference numeral 12A denotes an aperture, reference numeral 12B denotes a phase adjusting element, and reference numeral LN denotes a lens.

An incident light beam is of "a plane light wave having uniform intensity", and is cut into a beam having a desired beam width (which is determined so that a desired beam spot size is achieved on a scanning surface) through the aperture 12A. The phase adjusting element 12B is attached closely (zero distance) to the aperture 12A, and carries out phase adjustments on the light beam.

The lens LN is assumed to be "an ideal lens having no aberration". The phase adjusting element 12B is disposed on a front focal plane of the lens LN across a focal length "f". In this makeup, the light beam is focused into a beam spot at the position of a back focal point of the lens LN.

In this simulation model, diverging light beams from a multibeam light source are turned to parallel light beams through a collimating lens, and are incident on the aperture 12A. The collimating lens in the focusing optical system is, therefore, a prerequisite for the simulation model. The lens LN represents a simplified form of "a portion that is arranged after the phase adjusting element 12B" in the focusing optical system.

The lens LN used in the simulation, therefore, is different from a lens used in the actual multibeam optical scanning device, but offers the same effect as described below when used in the actual multibeam optical scanning device. A light beam in the actual multibeam optical scanning device is a Gaussian beam having the Gaussian light intensity distribution, and a result of the simulation is effective when the light beam is the Gaussian beam. This is because a method for expanding the depth allowance of the present invention is a method of controlling a beam profile on a focusing plane by controlling a phase distribution only.

The opening of the aperture 12A is of "a circle having a diameter of 930 micrometers", and the focal length f of the lens LN is 50 millimeters. An operation wavelength is 632.8 nanometers.

Figure 19A:
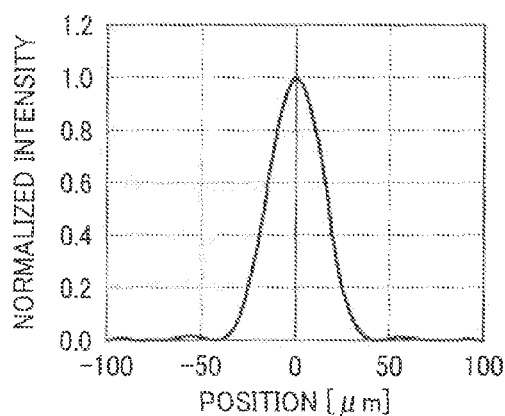
FIGS. 19A and 19B are graphs representing comparison examples of the simulation modeled in FIG. 18.
Figure 19B:
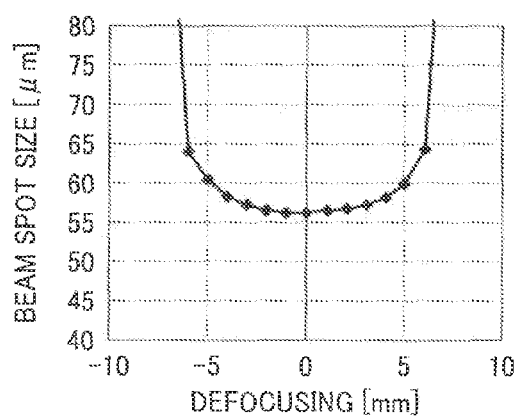
Figure 20A:
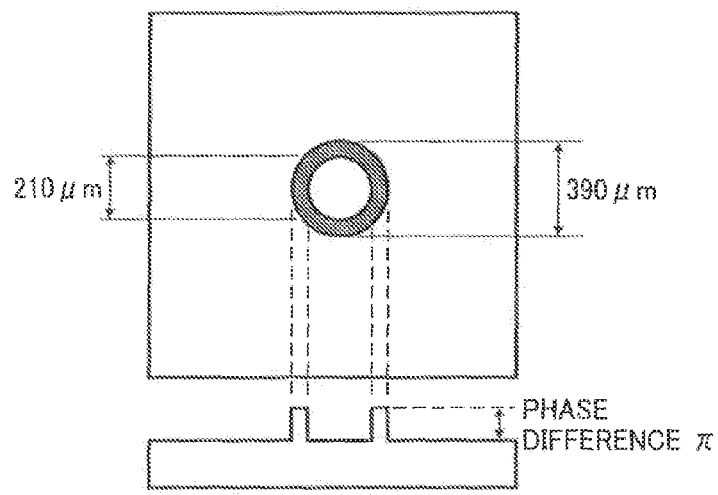
FIGS. 20A to 20C are schematic diagrams representing simulation examples of a phase adjusting element.
Figure 20B:
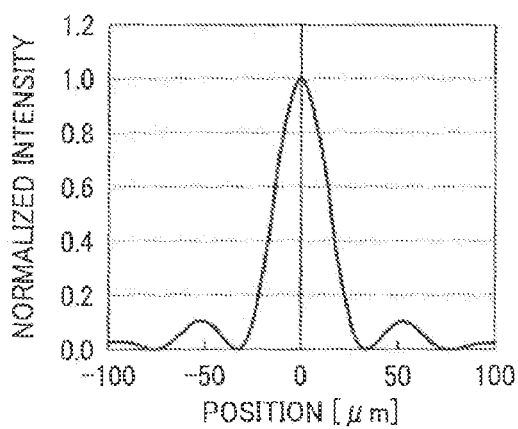
Figure 20C:
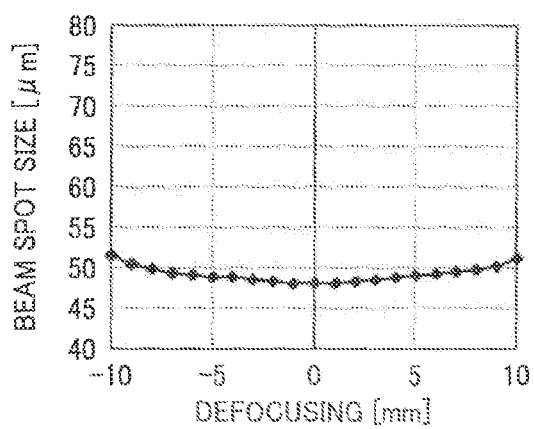
Figure 21A:
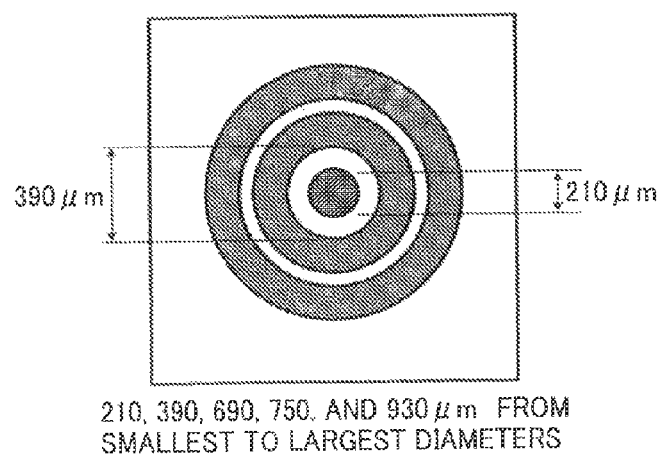
FIGS. 21A to 21C are schematic diagrams representing simulation examples of a phase adjusting element.
Figure 21B:
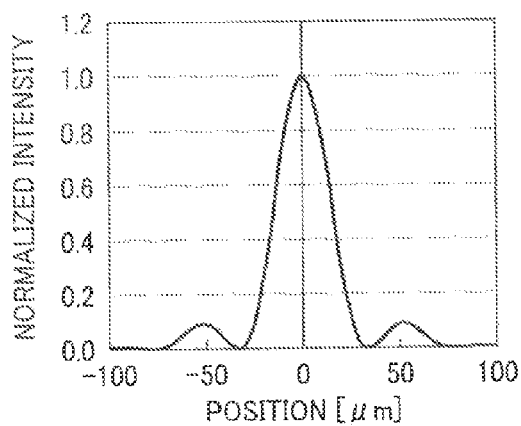
Figure 21C:
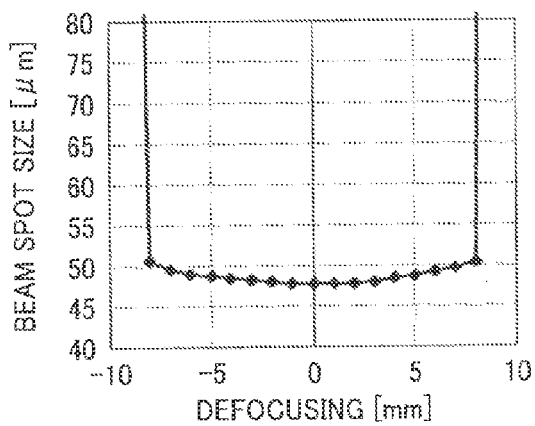
Figure 22A:
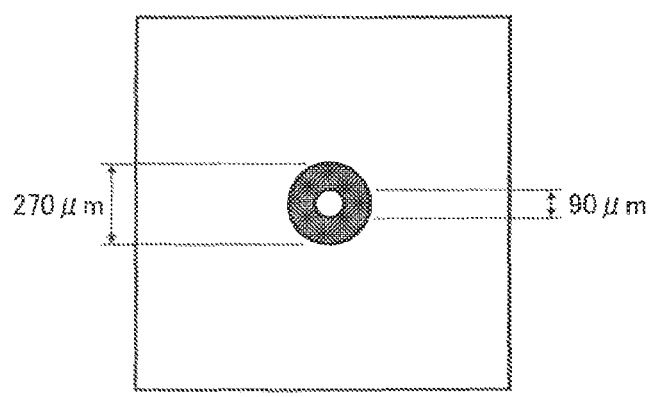
FIGS. 22A to 22C are schematic diagrams representing simulation examples of a phase adjusting element.
Figure 22B:
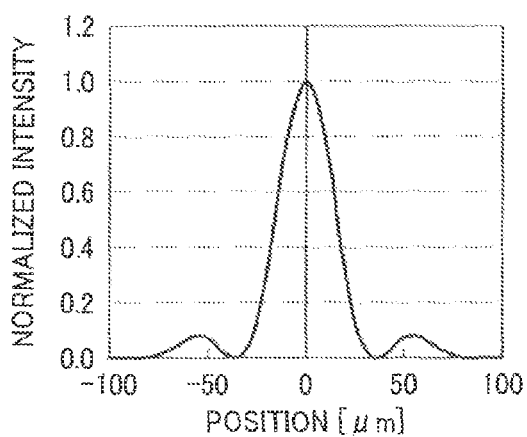
Figure 22C:
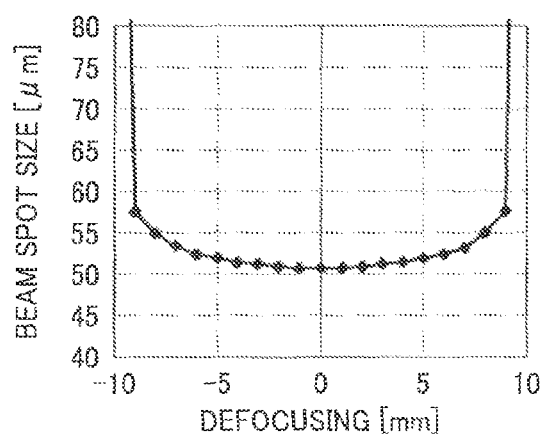
Figure 23A:
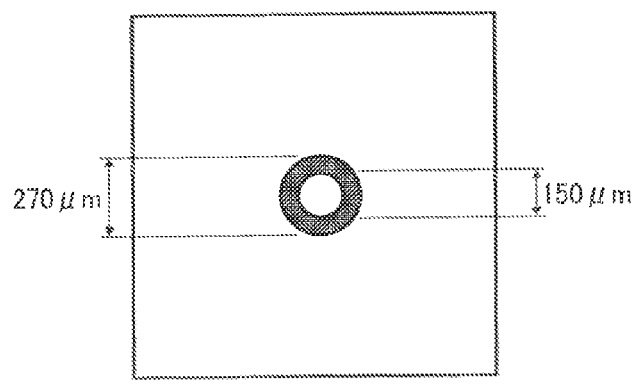
FIGS. 23A to 23C are schematic diagrams representing simulation examples of a phase adjusting element.
Figure 23B:
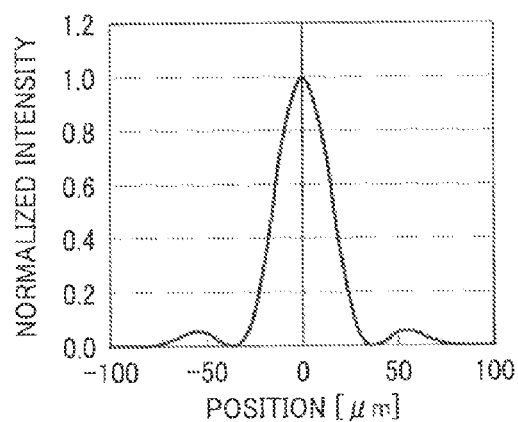
Figure 23C:
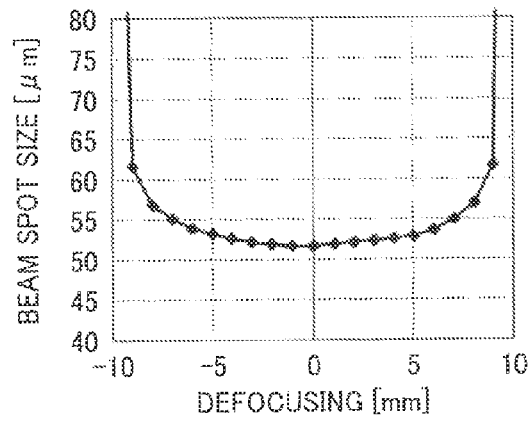
Figure 24A:
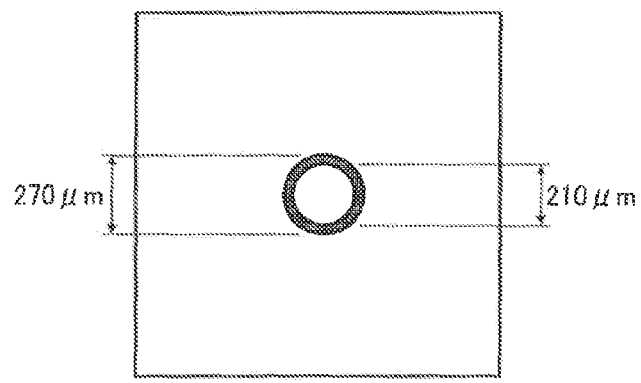
FIGS. 24A to 24C are schematic diagrams representing simulation examples of a phase adjusting element.
Figure 24B:
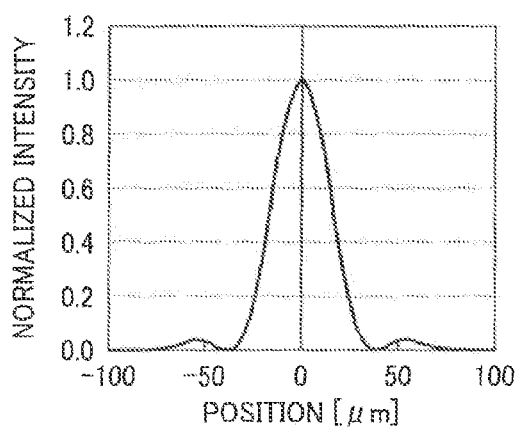
Figure 24C:
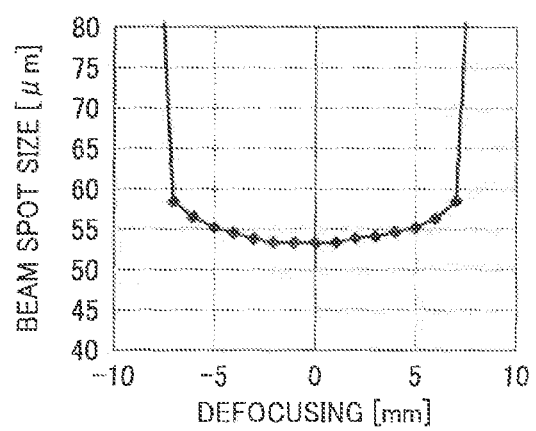

Comparison examples are shown in FIGS. 19A and 19B. FIG. 19A depicts the beam profile (with the normalized peak intensity of one) of a beam spot that is formed at the position of the focal point (position of the focusing plane) of the lens LN when phase adjustments by the phase adjusting element 12B are not performed (which means that the phase adjusting element is regarded as a transparent plate having no phase distribution), and FIG. 19B depicts "a change in a beam spot size due to defocusing".

Under these conditions, when the peak intensity of a side lobe of the beam spot is 0.016 (1.6% of the peak intensity) and the upper limit of an allowable range of the depth allowance is "105% of the minimum beam spot size", the depth allowance is 8.9 millimeters.

FIGS. 20A to 24C, in the same manner as in FIGS. 19A and 19B, depict the beam profiles of beam spots that result when phase adjustments by the phase adjusting element 12B are performed, and "changes in the beam spots due to defocusing". Each of FIGS. 20A, 21A, 22A, 23A, and 24A depicts the shape and size of a phase distribution pattern (thicker portion) on the phase adjusting element, each of FIGS. 20B, 21B, 22B, 23B, and 24B depicts the beam profile of the beam spot on the focusing plane, and each of FIGS. 20C, 21C, 22C, 23C, and 24C depicts "a change in the beam spot size due to defocusing".

A phase difference given by the phase distribution is "π".

As shown in FIGS. 20A, 21A, 22A, 23A, and 24A, "every phase distribution pattern is a circle", where the center of the aperture coincides with that of the phase distribution pattern.

Comparing the beam profiles of FIGS. 20B, 21B, 22B, 23B, and 24B with the beam profile of FIG. 19A reveals that the peaks of side lobes of the beam profiles of FIGS. 20B, 21B, 22B, 23B, and 24B are increasing compared to the peak of the side lobe of the beam profile of FIG. 19A, and also reveals that the depth allowance is expanding in the beam profiles of FIGS. 20C, 21C, 22C, 23C, and 24C.

This indicates that using the phase adjusting element having the phase distribution that increases the peak intensity of the side lobe expands the depth allowance, and the beam profile in which the peak intensity of the side lobe is higher offers "a greater expansion rate of the depth allowance".

The depth allowance is expanding in each of FIGS. 20C, 21C, 22C, 23C, and 24C because the phase distribution is set to "expand the depth allowance without increasing the beam spot size".

Such an effect may riot be obtained even when phase adjustments are performed if a phase distribution used in phase adjustments is not proper.

Figure 25A:
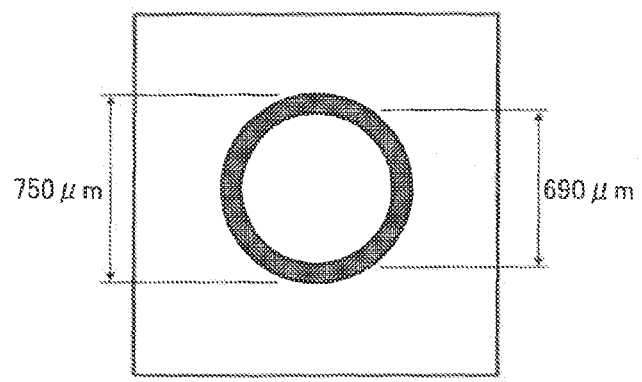
FIGS. 25A to 25C are schematic diagrams for explaining a phase adjusting element having no effect of expanding the depth allowance.
Figure 25B:
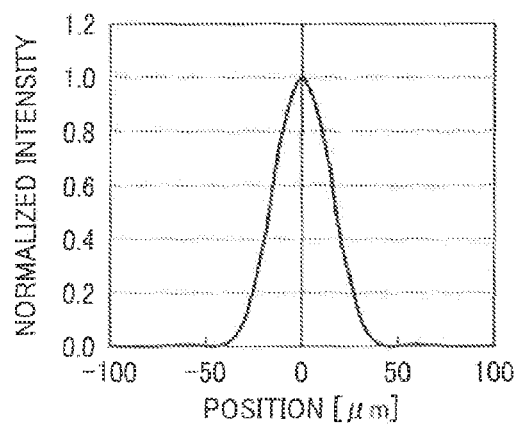
Figure 25C:
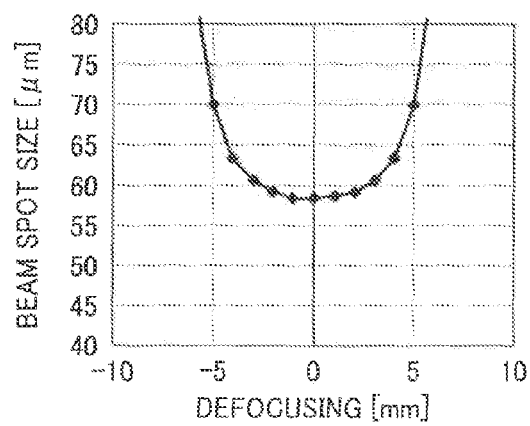

An example of such a case is presented by FIGS. 25A to 25C that, in the same manner as in FIGS. 20A to 24C, depicts a simulation result in a case of use of "a phase adjusting element having noneffective phase distribution".

Except a phase distribution pattern, a simulation condition for the simulation of FIGS. 25A to 25C is the same as that for the simulation of FIGS. 20A to 24C.

Comparing FIG. 25C with FIGS. 20C, 21C, 22C, 23C, and 24C reveals clearly that the depth allowance is decreasing in FIG. 25C.

As described above, properly setting a phase distribution of a phase adjusting element expands the depth of a beam spot size near the position of the focal point of a lens. This does not invite addition of a lens, etc., to a relay optical system, etc., which is extremely advantageous for system layout, and offers extremely high light use efficiency.

The phase adjusting element in "the case of not performing phase adjustments" that gives the result of FIGS. 19A and 19B is represented as the phase adjusting element 0, the phase adjusting elements shown in FIGS. 20A, 21A, 22A, 23A, and 24A are represented as the phase adjusting elements 1 to 5, and the phase adjusting element shown in FIG. 25A is represented as the phase adjusting element 6, and the peak intensity of the side lobes, the depth allowances, and the beam spot sizes in the cases of FIGS. 19A and 19B, 20A to 24C, and 25A and 25C are calculated. The result of the calculation is shown in Table 1 below.

The peak intensity of the side lobe ("SP" in Table 1) is expressed as the ratio of peak intensity of the side lobe (%) to the peak intensity of the main lobe when the peak intensity of the main lobe is normalized intensity of one, the depth allowance is calculated on the assumption that "a change in the beam spot size is within a range of 105% of the minimum beam spot size", and the beam spot size is calculated as the diameter that takes a value of "1/$e^2$" when the peak value of the light intensity distribution of the beam spot is one.

TABLE 1

|  | SP (%) | depth allowance (mm) | beam spot size (μm) |
|---|---|---|---|
| Phase adjusting element 0 | 1.6 | 8.9 | 56.4 |
| Phase adjusting element 1 | 10.4 | 18.1 | 48.1 |
| Phase adjusting element 2 | 9.6 | 15.0 | 47.7 |
| Phase adjusting element 3 | 8.1 | 13.8 | 50.7 |
| Phase adjusting element 4 | 5.8 | 12.9 | 51.8 |
| Phase adjusting element 5 | 3.8 | 11.2 | 53.3 |
| Phase adjusting element 6 | 0.6 | 6.4 | 58.4 |

In the Table 1, the beam spot size of 56.4 micrometers in the case of not performing phase adjustments (phase adjusting element 0) is considered to be equivalent to "a target beam spot size in designing". As a result of phase adjustments by the phase adjusting elements 1 to 5, the beam spot size become smaller than the target beam spot size in every case.

The depth allowance is expanded to become larger than a target depth allowance through phase adjustments by the phase adjusting elements 1 to 5. When the phase adjusting elements 1 to 5 are used, the peak intensity of high-order side lobe light is low. Generation of high-order light having high peak intensity is not observed on "the outside of the graphs" of FIGS. 20B to 24B, which indicate the generation of main lobe light having high intensity.

Figure 26:
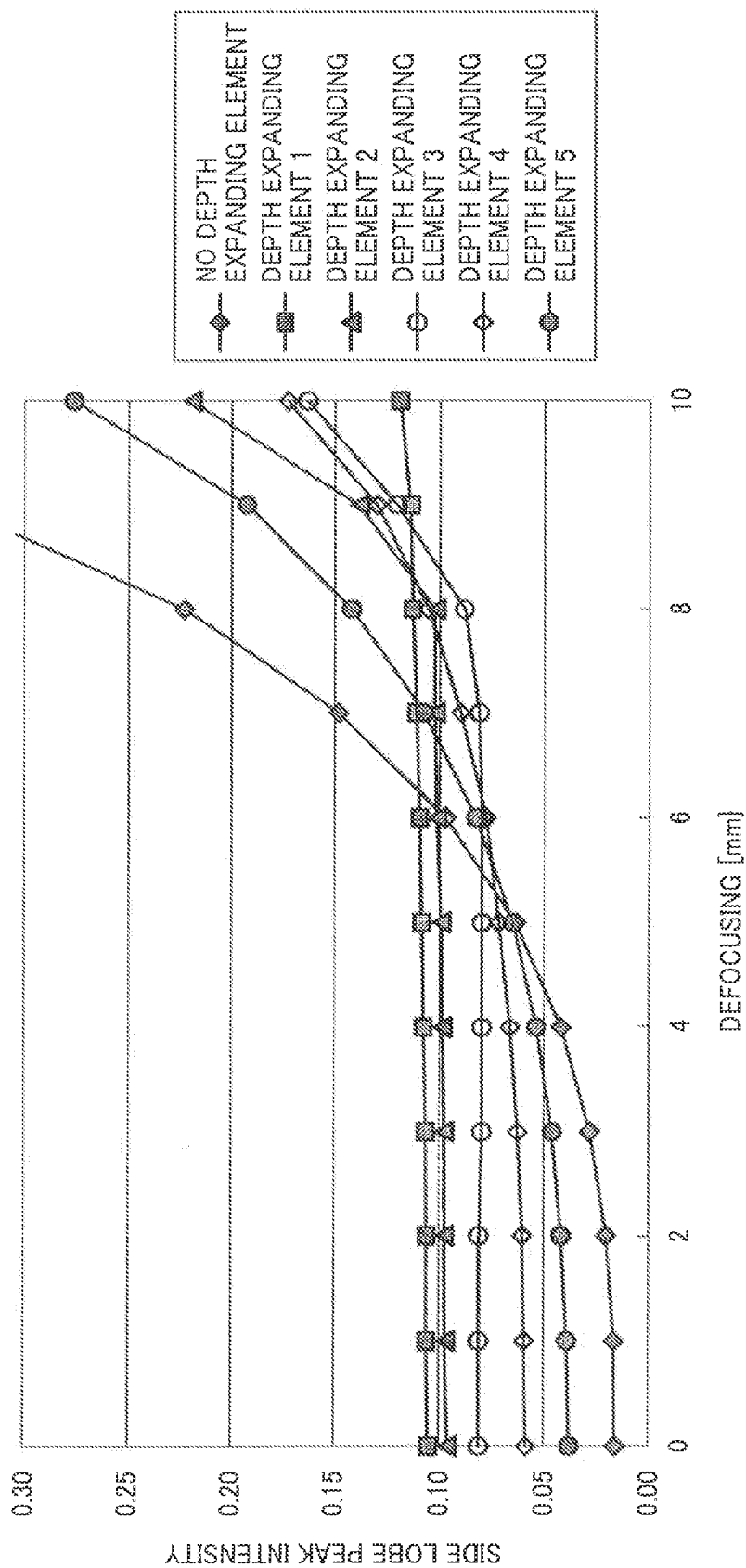
FIG. 26 is a graph representing defocusing and side lobe peak intensity in both cases of using a phase adjusting element and not using the phase adjusting element.

FIG. 26 is a graph whose horizontal axis represents defocusing (mm) and vertical axis represents side lobe peak intensity (when main lobe peak intensity is a normalized value of one) in a case of not using the phase adjusting element and a case of using the phase adjusting elements 1 to 5. When the above mentioned phase adjusting element 6 is used, the degradation of a beam profile at a position other than the focusing position is severe, where side lobe light and main lobe light overlap each other to "make it impossible to distinguish the peak intensity of the side lobe from main lobe light". A case of use of the phase adjusting element 6, therefore, is not shown in the graph.

Referring to FIG. 26, at the focusing plane position (defocusing 0 millimeter), "the side lobe peak intensity in the case of no use of the phase adjusting element" is the smallest. In an area where defocusing is larger than 5 millimeters to 6 millimeters, however, the side lobe peak intensity is smaller when the phase adjusting element is used, which is preferable.

While "a rotation symmetrical circle (ring)" is described as an example of a phase distribution pattern in the above description, the shape of the phase distribution pattern is not limited to this example. As shown in FIG. 6A, it is most preferable that the phase distribution pattern have a height distribution that is free two-dimensionally and that is axisymmetric with regard to the main scanning direction and to the sub scanning direction, and that does not have "90 degrees rotation symmetry". The phase distribution pattern, however, can be given 90 degrees rotation symmetry, as shown in FIG. 6B, and can be set as "concentric elliptical phase distribution patters", as shown in FIGS. 6C and 6D.

As mentioned before, the above simulation is carried out using "a simplified model", which is different from an actual optical system. In the optical system of the simulation, a lens system arranged after the phase adjusting element is typified by the rotation symmetrical lens LN having a focal length F=50 millimeters. In the actual multibeam optical scanning device, however, a synthetic focal length of an optical system arranged after the aperture varies, and a focal length in the main scanning direction and that in the sub scanning direction also vary from each other.

When the focal length varies, a beam spot size changes but "the beam profile of the beam spot" hardly changes. To change only the beam spot size without changing the beam profile, the opening of the aperture and the phase adjusting element are expanded (or shrunk) proportionally. In this case, because the focal length in the main scanning direction and that in the sub scanning direction vary from each other, the rate of proportional expansion (or shrinkage) of the opening of the aperture and the phase adjusting element is determined to be different between the main scanning direction and the sub scanning direction. In the ordinary multibeam optical scanning device, the aperture opening has "a shape elongated in the main scanning direction".

In the simulation model, an incident light beam is assumed to be "a plane light wave having uniform intensity", but the intensity distribution of the incident light beam is usually the Gaussian distribution. A change in the intensity distribution of the incident light beam causes a change in the profile and size of the beam, but the intensity distribution of light passing through the aperture opening can be regarded as virtually uniform intensity distribution, which can be applied directly to the actual multibeam optical scanning device (although proportional expansion (or shrinkage) of the aperture opening and the phase adjusting element is necessary). A difference in the intensity distribution of the incident light beam is compensated by slightly modifying the shape of the aperture opening or the phase adjusting element. As a result, the same result as that of the simulation using the simplified model is obtained by the actual multibeam optical scanning device.

Using the multibeam optical scanning device of the present invention allows expansion of the depth allowance of a beam spot size on a scanning surface. This enables a reduction in the beam spot size without shrinking the depth allowance of the beam spot size, thus achieving an image forming apparatus offering high image quality.

Expanding the depth allowance means stabilizing the beam spot size. This means that "one of a plurality of process control conditions is stabilized". The frequency of process controls, therefore, is reduced, which enables environmental load reduction, such as energy-saving.

While the color image forming apparatus is described above as an example, the present invention can apply also to a monochromatic image forming apparatus.

The image forming apparatus of the present invention can be used as a multifunction printer, a digital copier, a laser printer, a laser facsimile, etc., and the multibeam optical scanning device is used as a device that writes an image in the image forming apparatus.

In the specification, "a plurality of light sources" represents a laser light source having a plurality of light-emitting sources. Specifically, the laser light source is provided as a light source that synthesizes light beams from a plurality of edge emission semiconductor lasers through a prism, or as a light source composed of an array of semiconductor lasers or VCSEL light sources that are arrayed in a single dimension or two dimensions in the same element. Among these, the light source composed of the VCSEL light sources arrayed in a single dimension or two dimensions in the same element is preferable. The plurality of light sources is also referred to as "multibeam light source".

Moreover, "a collimating lens" has a function of converting a diverging light beam coming in from the light source side into a form of light beam fit for an optical system arranged after the collimating lens. The collimating lens works to convert the diverging light beam into a parallel light beam or a light beam having a weak diverging property or weak converging property.

Furthermore, beam shaping by "the aperture" is carried out to prevent a time-dependent change in a beam spot size that is caused by "the manufacturing-based dispersion or time-dependent dispersion of the divergence angle" of the diverging light beam coming in from the light source side. Beam reshaping shapes the width of a light beam incident on a focusing lens system (optical system arranged after the aperture) into a constant width in the main scanning direction and sub scanning direction. Providing the aperture significantly suppresses the fluctuation of the beam spot size.

Moreover, "a phase distribution of light" is a phase distribution on the wave surface of a light beam. "The phase distribution of light" is adjusted by the phase adjusting element. For example, when a light beam is in the form of a plane light wave, the wave surface of the light beam, which is the surface at the same phase, is plane. When such a plane light wave is subjected to phase adjustment by the phase adjusting element, the surface at the same phase is changed according to phase adjustment by the phase adjusting element, from "the plane before phase adjustment" to "a wave surface having irregularities" that corresponds to a relative advance and delay of a phase.

Furthermore, "a focusing optical system" is an optical system that is disposed on a light path leading from a multi-beam light source to a scanning surface and that works to focus a light beam. The focusing optical system includes the collimating lens, the cylinder lens, the aperture, the phase adjusting element, and the scanning optical system.

Moreover, "the position of a focusing surface of the focusing optical system" is a design-based surface position where a light beam is caused to form a beam spot by the focusing optical system, representing the design-based position of the scanning surface.

Furthermore, "a phase distribution on the phase adjusting element" is a phase distribution that is set on the phase adjusting element so that the phase adjusting element gives a two-dimensional phase change to the wave surface of a light beam. For example, when the phase adjusting element made of a transparent parallel plate is assumed, and the thickness D of the parallel plate "changes two-dimensionally in the wavelength order" and is expressed by a function of the coordinate (x, y) on a parallel-plate-like coordinate system as D (x, y), the optical thickness of the phase adjusting element is defined as "ND (x, y)", where the refraction factor of the material of the phase adjusting element is N.

When a light beam of a plane light wave is incident on such a phase adjusting element, a time for the light beam to pass through the phase adjusting element changes depending on the optical thickness ND (x, y). The greater the optical thickness is, "the longer the time for passing is". The phase of the light beam, therefore, delays in proportional to the optical thickness ND (x, y). Hence the phase of the light beam having passed through the phase adjusting element changes two-dimensionally in correspondence to the optical thickness ND (x, y).

Giving such a phase change means "phase adjustment". In this example, the distribution of the optical thickness ND (x, y) on the phase adjusting element is "the phase distribution on the phase adjusting element". In this example, the refraction factor of the material of the phase adjusting element is the uniform refraction factor N, so that the thickness distribution ND (x, y) determines "the phase distribution on the phase adjusting element". In contrast, if the thickness D of the phase adjusting element is made uniform while the refraction factor N is changed two-dimensionally to define the optical thickness as DN (x, y), the same phase adjustment can be carried out. In this case, DN (x, y) represents "the phase distribution on the phase adjusting element".

As described above, the phase adjusting element is the element capable of giving "an areal phase distribution" to a light beam. Specifically, phase distribution on the phase adjusting element is realized by forming a portion of refraction factor distribution or height distribution on a transparent substrate made of glass, resin, etc. In terms of easiness in manufacturing, realizing phase distribution through "thickness distribution" on the phase adjusting element is better.

A two-dimensional form of "the phase distribution" on the phase adjusting element is called "a phase distribution pattern".

Moreover, the phase distribution on the phase adjusting element is "the phase distribution in an areal region", but the phase distribution is not limited to a two-dimensional distribution but can be carried out as a one-dimensional distribution, through which "phase adjustment in a single direction" is carried out on the wave surface of a light beam. Besides, it is possible to carry out one-dimensional phase adjustment at two spots and set the phase adjustment at each spot perpendicular to each other to carry out two-dimensional phase adjustment. If such a one-dimensional phase distribution is considered to be a "phase distribution pattern" that is a two-dimensional form of phase distribution, for example, such a one-dimensional phase distribution is equivalent to a phase distribution pattern such that "a shape of phase adjustment through irregularities" is present in one direction on a two-dimensional plane on which the sectional shape of the irregularities is invariable in the direction perpendicular to the one direction.

Furthermore, "when phase adjustment by the phase adjusting element is not carried out" means a case where the phase adjusting element does not have a phase adjusting function, for example, when the phase adjusting element is the above parallel plate, means a case where a phase distribution pattern is not formed on the parallel plate.

Moreover, the phase adjusting element is not limited to the above element made of the parallel plate, and is not limited to the translucent element but can be provided as a reflective element.

Furthermore, "integrated" means a state where the positional relation in space between a plurality of integrated elements is fixed. Moreover, "Integrated" includes not only a state where "a plurality of elements is structurally integrated", but also a state where a plurality of elements is held with a common holding unit so that the elements are fixed to each other in mutual positional relation.

Moreover, two or more electrostatic latent images formed by optical scanning can be formed at the same location on a single image carrier one by one in shifted time sequence, or can be formed at different locations on the single image carrier. Electrostatic latent images can be formed separately one by one on a plurality of image carriers.

According to an aspect of the present invention, "the phase adjusting element capable of adjusting a phase distribution of light" performs phase adjustments of the wavefronts of light beams to expand a depth allowance without substantially increasing the beam spot size of each of beam spots on a scanning surface. As a result, the beam spot size is reduced in an intended manner, and the increased depth allowance stabilizes the beam spot size. This enables fine multibeam optical scanning. Hence the image forming apparatus using this multibeam optical scanning device is capable of performing fine image formation at high speed.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A multibeam optical scanning device comprising:
a plurality of light sources that respectively emit a plurality of light beams;
a collimating lens that collimates the light beams;
an aperture that shapes the light beams output from the collimating lens;
a cylinder lens that focuses the light beams to form a plurality of line images each elongated in a main scanning direction and separated in a sub scanning direction near a deflecting reflection surface of a light deflecting unit that deflects the light beams focused by the cylinder lens;
a scanning optical system that focuses the light beams deflected by the light deflecting unit into a plurality of beam spots separated in the sub scanning direction on a scanning surface to scan the scanning surface simultaneously with the beam spots; and
a phase adjusting element that performs phase adjustments of wavefronts of the light beams to expand a depth allowance without substantially increasing a beam spot size of each of the beam spots on the scanning surface.

2. The multibeam optical scanning device of claim 1, wherein a phase distribution on the phase adjusting element is set to satisfy $$PS/PM > PS1/PM1,$$

where PS1 is peak intensity of a side lobe light and PM1 is peak intensity of a main lobe light in a light intensity profile at a position on a focusing surface of the focusing optical system when the phase adjustments are not performed by the phase adjusting element, and PS is peak intensity of the side lobe light and PM is peak intensity of the main lobe light in a light intensity profile at the position on the focusing surface of the focusing optical system when the phase adjustments are performed by the phase adjusting element.

3. The multibeam optical scanning device of claim 1, wherein the aperture and the phase adjusting element are arranged to be close to each other on an optical axis of the collimating lens.

4. The multibeam optical scanning device of claim 1, wherein the aperture and the phase adjusting element are arranged to be integrated with each other on an optical axis of the collimating lens.

5. The multibeam optical scanning device of claim 1, wherein a condition of $w > (a + x \times d/f)$ is satisfied, where w is beam diameter of a light beam on the aperture, a is opening diameter of the aperture, x is distance from a back focal point of the collimating lens to the phase adjusting element, d is distance from a center of the light sources to a light source farthest from the center, and f is focal length of the collimating lens.

6. The multibeam optical scanning device of claim 1, wherein the phase adjusting element and the cylinder lens are integrated with each other on an optical axis of the collimating lens.

7. The multibeam optical scanning device of claim 6, wherein a distance between the collimating lens and the cylinder lens is smaller than $2 \times f$, where a f is focal length of the collimating lens.

8. The multibeam optical scanning device of claim 1, wherein the phase adjusting element and the collimating lens are integrated with each other on an optical axis of the collimating lens.

9. The multibeam optical scanning device of claim 6, wherein
at least one of optical planes of the collimating lens and the cylinder lens is a discontinuous plane, and
a phase difference on a discontinuous portion of the discontinuous plane is set to correspond to an integer multiple of $2\pi$ at an operation wavelength.

10. The multibeam optical scanning device of claim 8, wherein
at least one of optical planes of the collimating lens and the cylinder lens is a discontinuous plane, and
a phase difference on a discontinuous portion of the discontinuous plane is set to correspond to an integer multiple of $2\pi$ at an operation wavelength.

11. The multibeam optical scanning device of claim 1, wherein the phase adjusting element is arranged to be tilted against a plane perpendicular to an optical axis of the collimating lens.

12. An image forming apparatus that forms an image on a recording medium by forming a latent image on an image carrier using a multibeam optical scanning device and developing the latent image into toner image with toner, wherein the multibeam optical scanning device includes
a plurality of light sources that respectively emit a plurality of light beams;
a collimating lens that collimates the light beams;
an aperture that shapes the light beams output from the collimating lens;
a cylinder lens that focuses the light beams to form a plurality of line images each elongated in a main scanning direction and separated in a sub scanning direction near a deflecting reflection surface of a light deflecting unit that deflects the light beams focused by the cylinder lens;
a scanning optical system that focuses the light beams deflected by the light deflecting unit into a plurality of beam spots separated in the sub scanning direction on a scanning surface to scan the scanning surface simultaneously with the beam spots; and
a phase adjusting element that performs phase adjustments of wavefronts of the light beams to expand a depth allowance without substantially increasing a beam spot size of each of the beam spots on the scanning surface.

13. An image forming apparatus that forms a color image on a recording medium by forming at least two latent images on at least one image carrier using a multibeam optical scanning device, developing the latent images into toner images of different colors with toners of different colors, and superimposing the into toner images of different colors on the recording medium, wherein the multibeam optical scanning device includes
a plurality of light sources that respectively emit a plurality of light beams;
a collimating lens that collimates the light beams;
an aperture that shapes the light beams output from the collimating lens;
a cylinder lens that focuses the light beams to form a plurality of line images each elongated in a main scanning direction and separated in a sub scanning direction near a deflecting reflection surface of a light deflecting unit that deflects the light beams focused by the cylinder lens;
a scanning optical system that focuses the light beams deflected by the light deflecting unit into a plurality of beam spots separated in the sub scanning direction on a scanning surface to scan the scanning surface simultaneously with the beam spots; and
a phase adjusting element that performs phase adjustments of wavefronts of the light beams to expand a depth allowance without substantially increasing a beam spot size of each of the beam spots on the scanning surface.

* * * * *